SELF-REGULATING TRANSFORMER

Filed June 17, 1959 11 Sheets-Sheet 1

INVENTOR.
Carl Schindler
BY Lee H. Kaiser
Attorney

INVENTOR.

Carl Schindler

BY Lee H. Kaiser

Attorney

INVENTOR.
Carl Schindler
BY Lee H. Kaiser
Attorney

SELF-REGULATING TRANSFORMER

INVENTOR.
Carl Schindler
BY Lee H Kaiser
Attorney

Jan. 26, 1965 C. SCHINDLER 3,167,703

SELF-REGULATING TRANSFORMER

Filed June 17, 1959 11 Sheets-Sheet 5

INVENTOR.
Carl Schindler
BY Lee H Kaiser
Attorney

INVENTOR.
Carl Schindler
BY
Lee H Kaiser
Attorney

Jan. 26, 1965 C. SCHINDLER 3,167,703

SELF-REGULATING TRANSFORMER

Filed June 17, 1959

11 Sheets-Sheet 7

INVENTOR.
Carl Schindler
BY Lee H. Kaiser
Attorney

INVENTOR.
Carl Schindler
BY Lee H. Kaiser
Attorney

INVENTOR.
Carl Schindler
BY Lee H. Kaiser
Attorney

INVENTOR.
Carl Schindler
BY Lee H Kaiser
Attorney

Jan. 26, 1965 C. SCHINDLER 3,167,703

SELF-REGULATING TRANSFORMER

Filed June 17, 1959 11 Sheets-Sheet 11

INVENTOR.
Carl Schindler
BY Lee H. Kaiser
Attorney

United States Patent Office 3,167,703 Patented Jan. 26, 1965

3,167,703

SELF-REGULATING TRANSFORMER

Carl Schindler, Wauwatosa, Wis., assignor to McGraw-Edison Company, Milwaukee, Wis., a corporation of Delaware Filed June 17, 1959, Ser. No. 820,965
58 Claims. (Cl. 323—43.5)

This invention relates to stationary induction apparatus and in particular to voltage regulating stationary induction apparatus.

It is an object of the invention to provide a distribution transformer which maintains the secondary voltage within a desired voltage bandwidth. It is a further object of the invention to provide such a distribution transformer wherein both the voltage bandwidth and the midpoint of the bandwidth are adjustable.

Another object of the invention is to provide a distribution transformer having a novel tap changer adapted to change taps under load. A further object of the invention is to provide such a transformer having a tap changer provided with means to shunt the load current from one winding tap to the next and thus not interfere with the load. A further object is to provide such a transformer including a tap changer carrying novel means to limit the circulating current during the interval that two adjacent winding taps are bridged. Still another object of the invention is to provide such a distribution transformer having a tap changer disposed in a position which reduces erosion and deterioration of the arcing contacts during a tap change.

It is a further object of the invention to provide a self-regulating distribution transformer including a tap changer and voltage regulating apparatus for actuating the tap changer which is adopted to integrate with respect to both time and the magnitude of the voltage departure from a nominal value.

A further object of the invention is to provide a self-regulating transformer adapted to actuate a tap changer in a direction to accomplish a tap change and to bring the tap changer to rest at null positions displaced from the initial position in proportion to the departure of the voltage from a nominal value, whereby said transformer sums up all departures of voltage from the nominal value and responds only to the average of all preceding voltage departures.

Another object of the invention is to provide a self-regulating distribution transformer including a tap changer and unitary means for actuating the tap changer and controlling the direction of actuation thereof and including novel feedback means for bringing the tap changer to rest at null positions displaced from the initial position in proportion to the departure of the voltage from a nominal value. Still another object is to provide such a self-regulating distribution transformer having novel bandwidth determining means for disabling the feedback means after a predetermined actuation of the tap changer. A still further object is to provide such a self-regulating distribution transformer provided with direction-determining means occupying a position controlled by both the magnitude of the voltage and the feedback means and wherein the feedback means changes the position of the direction-controlling means at a compensation rate substantially equal to the rate at which the position of the direction-controlling means is changed by a variation in voltage incident to a tap change. It is an object of one embodiment of the invention to provide such a self-regulating distribution transformer having magnetically suspended valve means for controlling the direction of rotation of the tap changer and compensating spring means exerting a vertical force on the valve means and wherein the feedback means changes the deflection of the compensating spring means in accordance with the angular rotation of the tap changer. Still another object of this embodiment is to provide such a transformer wherein the feedback means compensates the magnetically suspended valve means at the same rate as the magnetic flux changes the position of the valve means incident to a tap change.

Another object of the invention is to provide an improved vibratory electromagnetic pump having opposed pistons within a cylinder one of which is connected to an armature arranged to vibrate due to the cyclic variations of the alternating current and the second of which is connected to a weight of sufficient mass to keep it from vibrating and wherein the armature and weight are resiliently connected by spring means having almost infinite life even though flexed continuously at the frequency of the pulsations of the alternating current.

These and other objects and advantages of the invention will be more readily apparent from the following detailed description when taken in conjunction with the accompanying drawing wherein.

Figure 1:
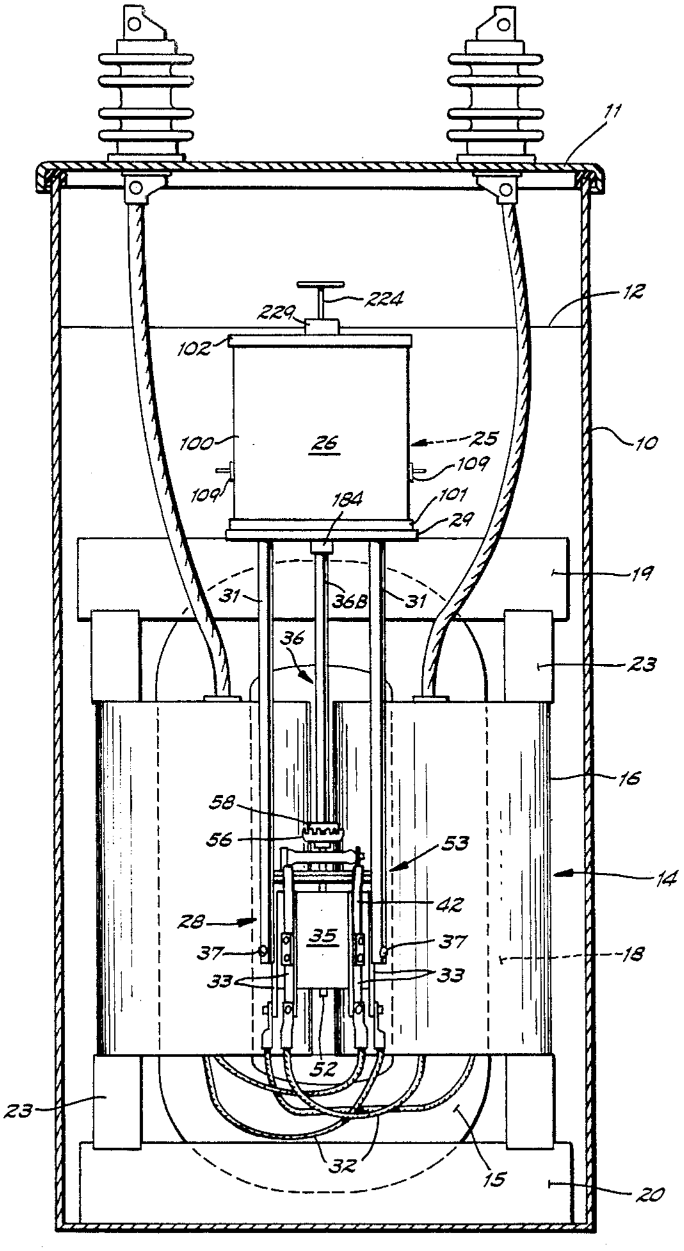
FIG. 1 is a vertical sectional view through a distribution transformer embodying the invention.
Figure 2:
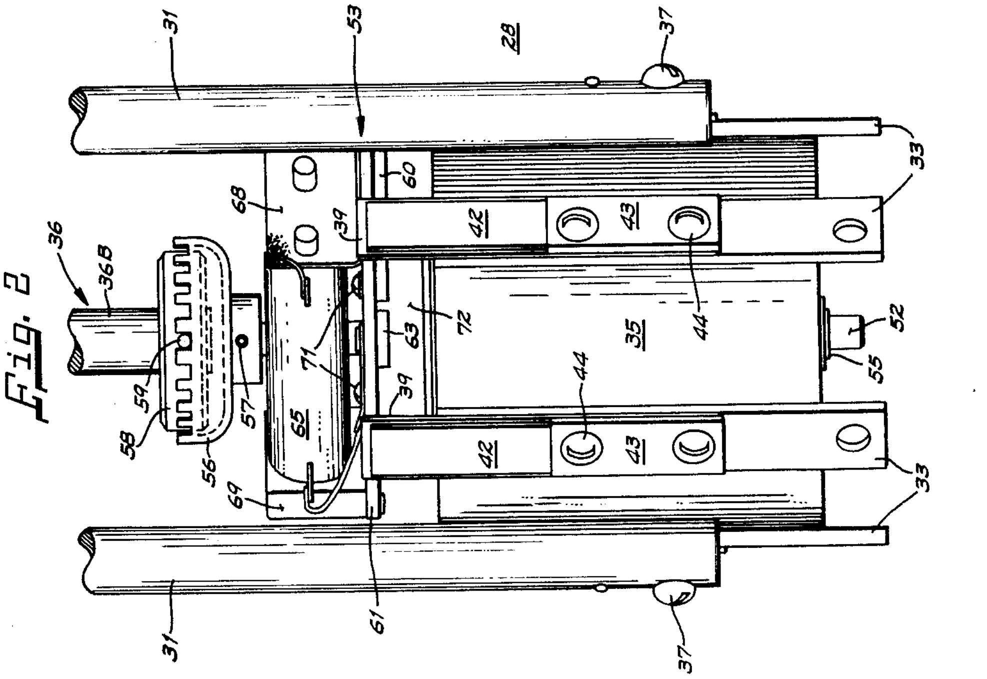
FIG. 2 is a front view of the tap changer of the embodiment of FIG. 1.
Figure 5:
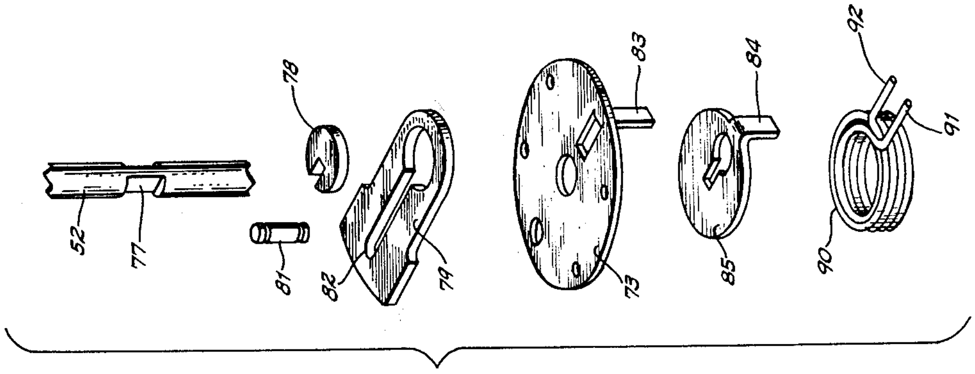
FIG. 5 is an exploded view of the operating mechanism of the tap changer.
Figure 4:
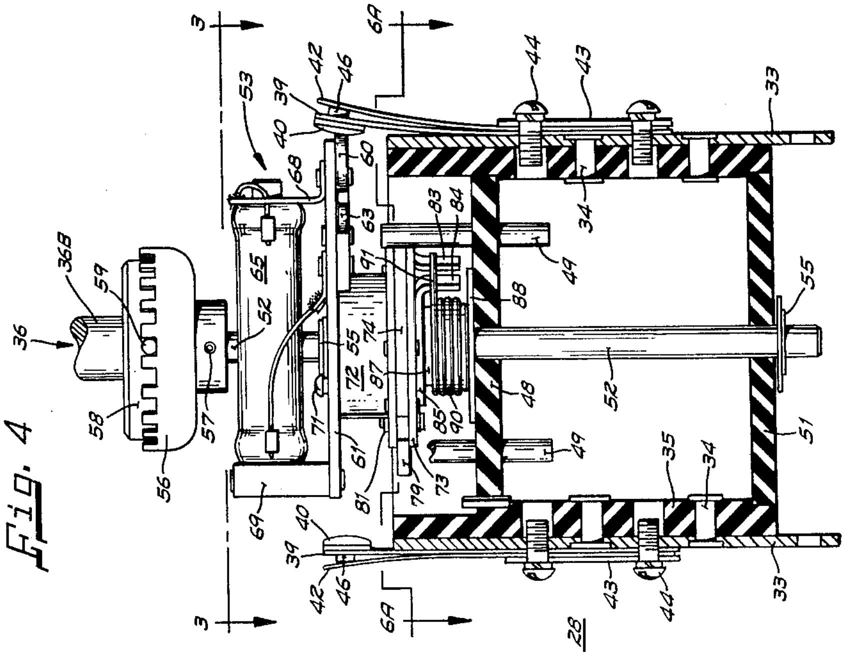
FIG. 4 is a vertical sectional view taken on line 4—4 of FIG. 3.
Figure 3:
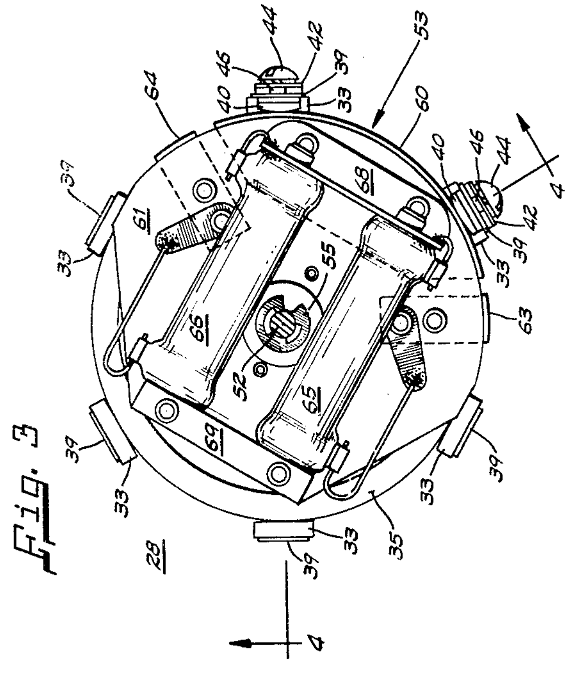
FIG. 3 is a top view of the tap changer of the embodiment of FIG. 1 taken on line 3—3 of FIG. 4.
Figure 6A:
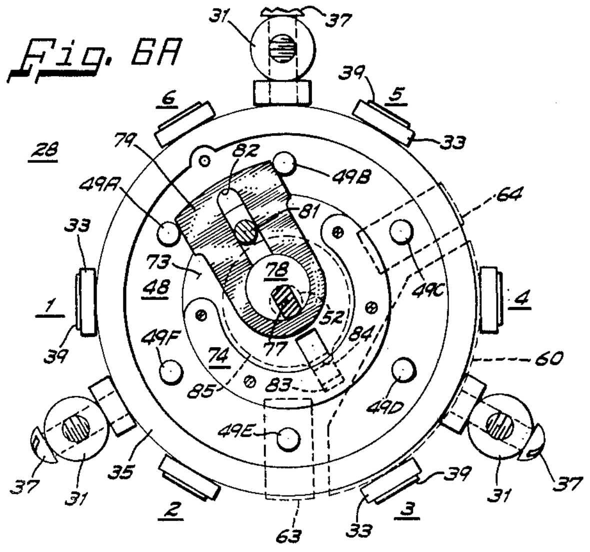
Figure 6B:
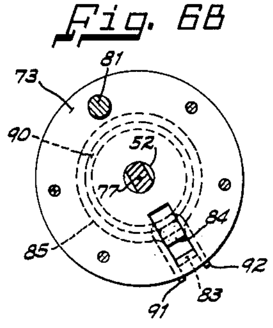
Figure 6C:
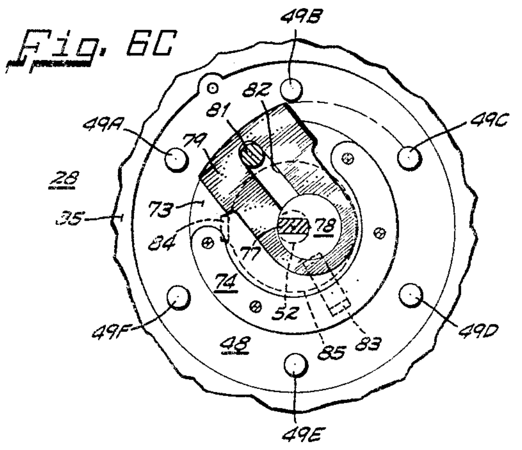
Figure 6D:
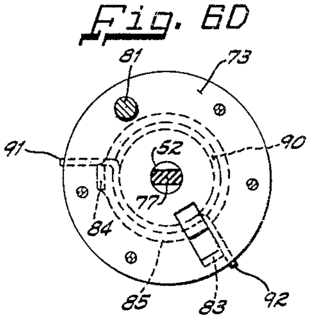
Figure 6E:
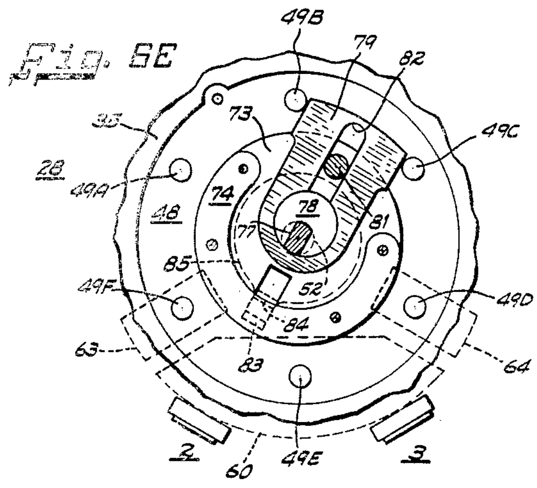
Figure 7A:
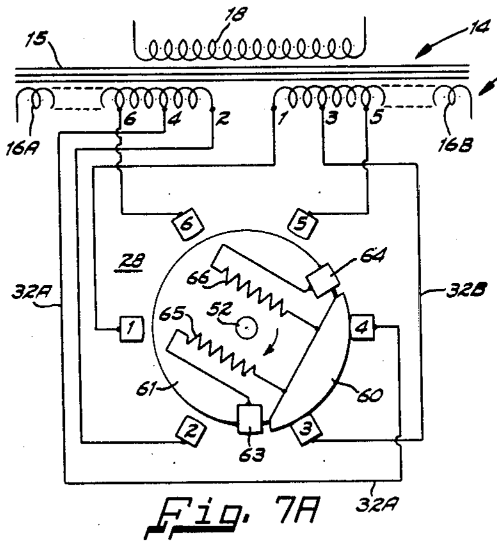
Figure 7D:
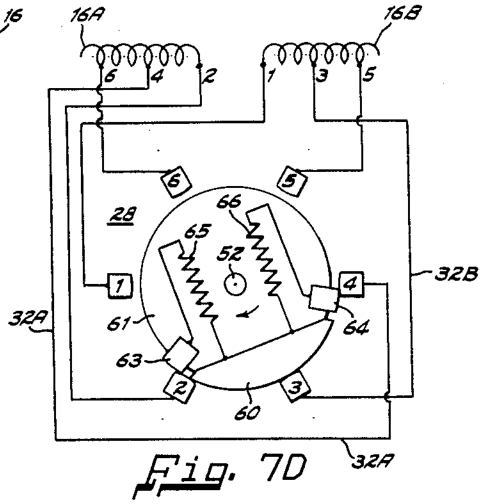
Figure 7B:
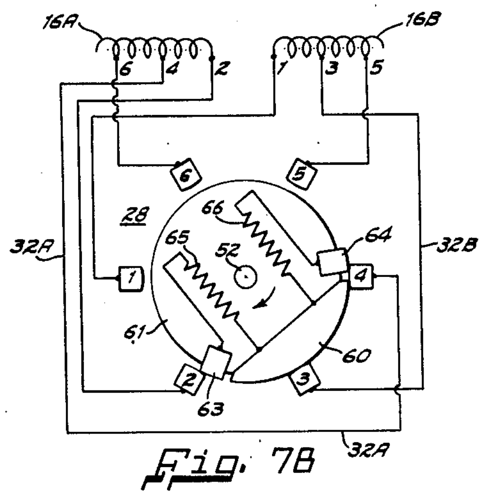
Figure 7E:
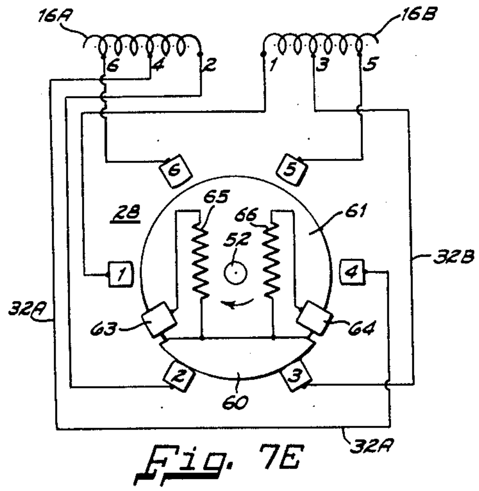
Figure 7C:
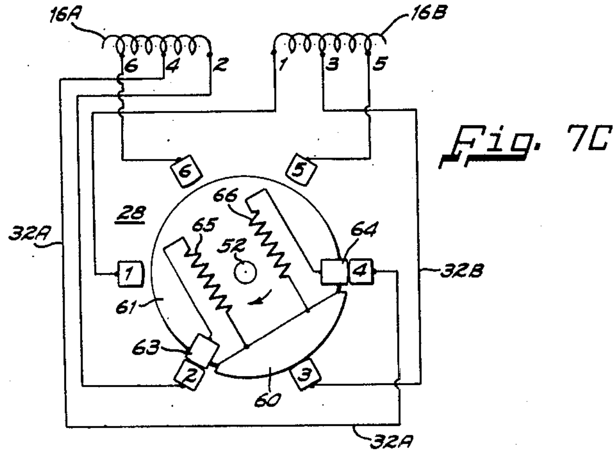
Figure 8:
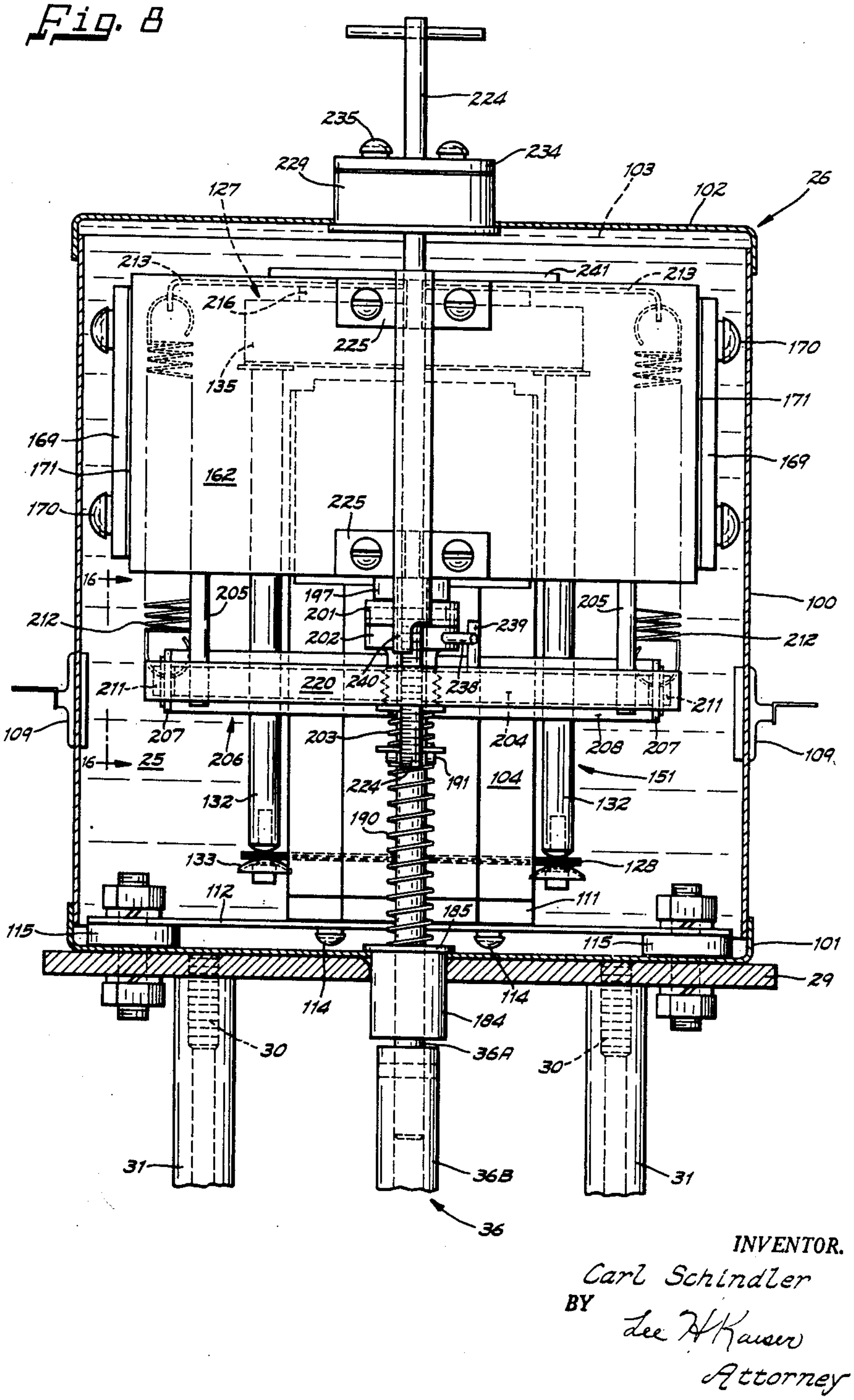
Figure 10:
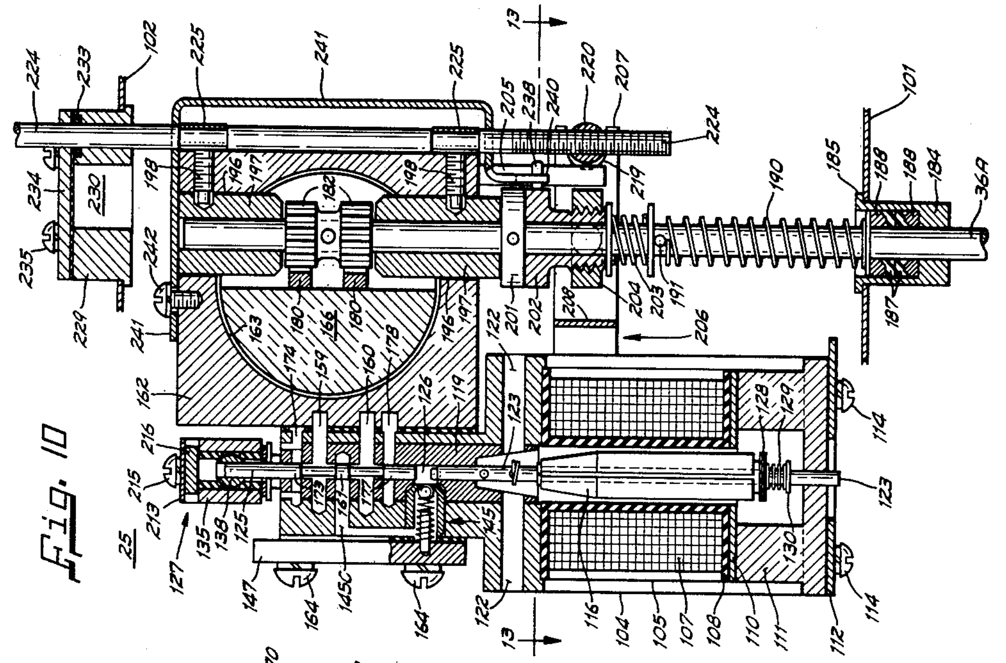
Figure 9:
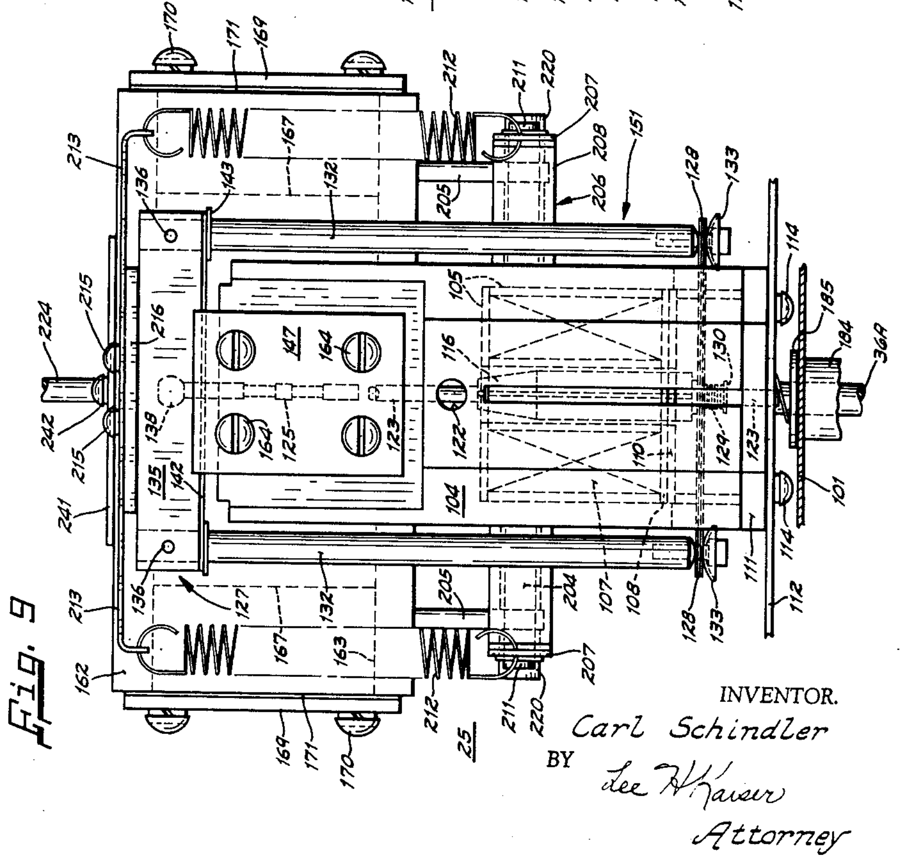
Figure 11:
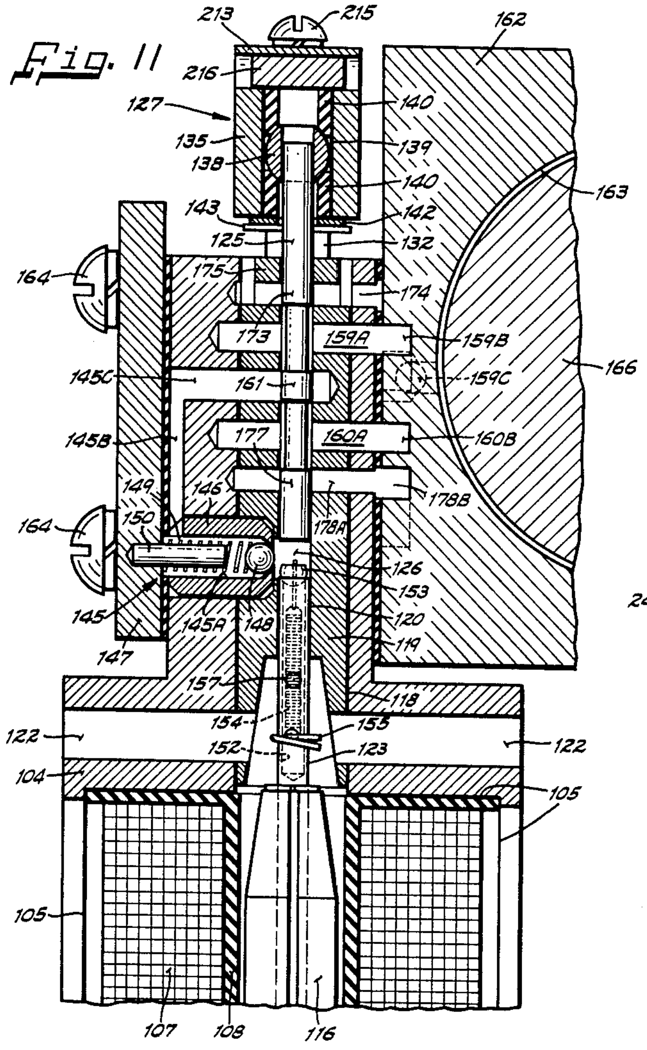
Figure 15:
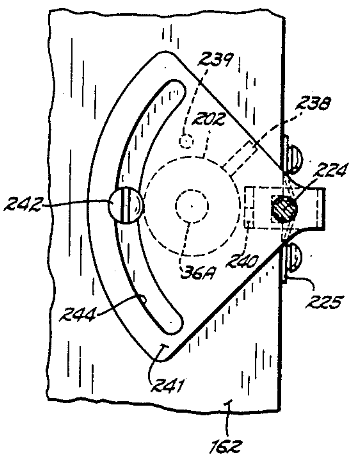
Figure 14:
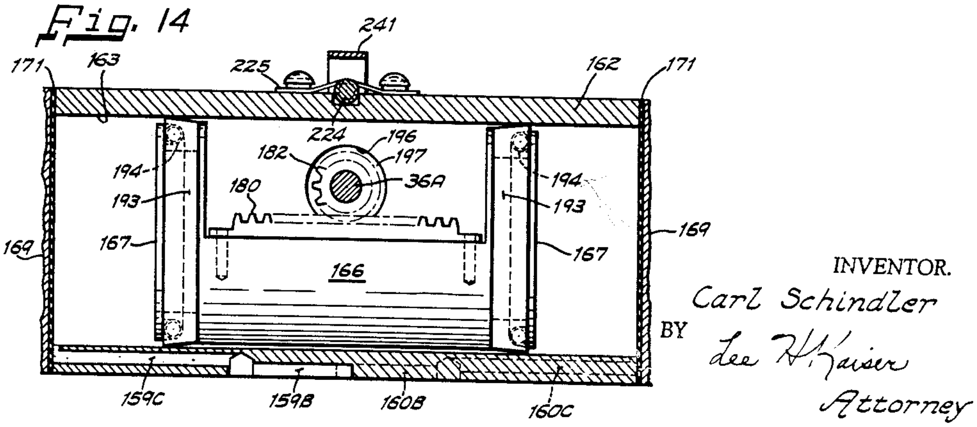
Figure 12:
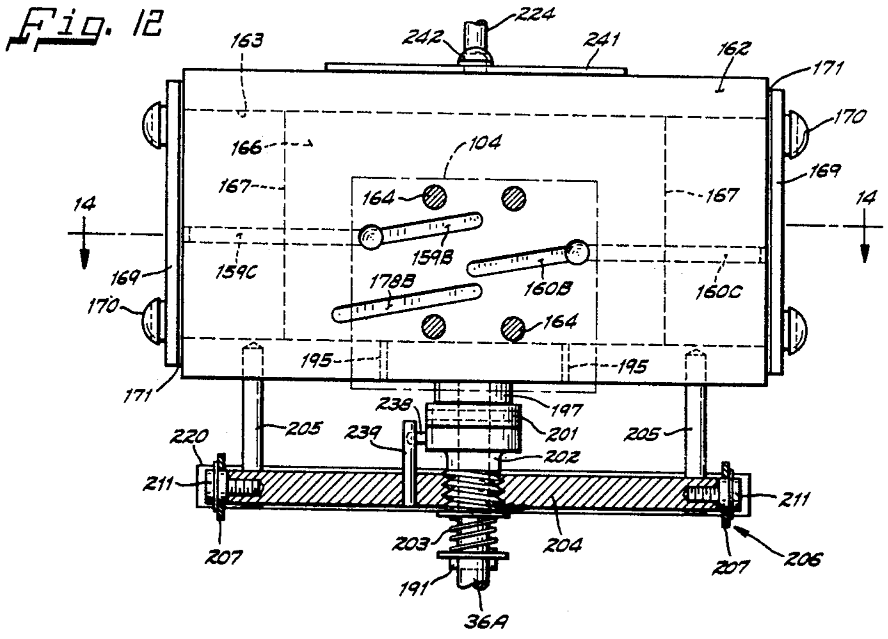
Figure 13:
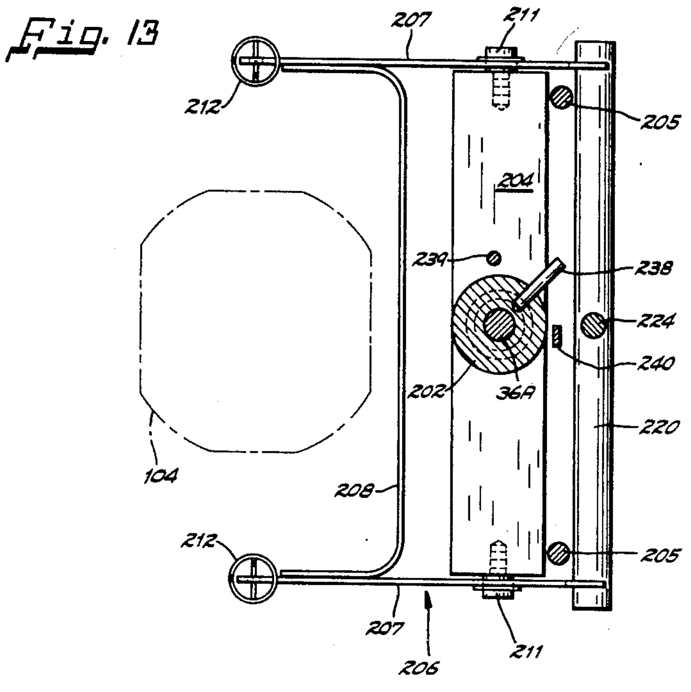
Figure 16:
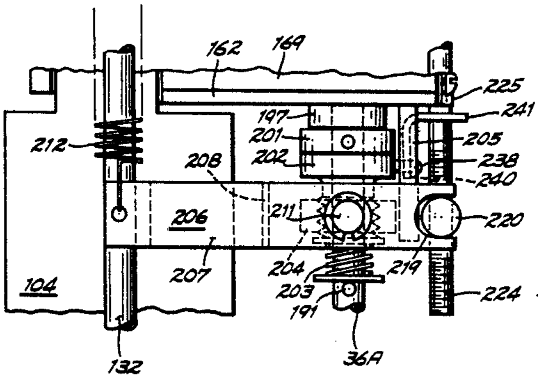
Figure 17:
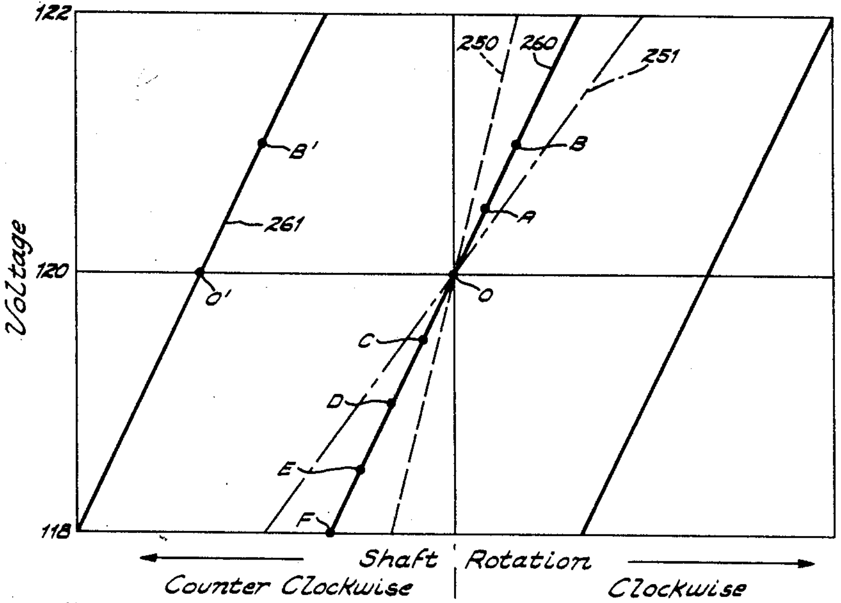
Figure 18:
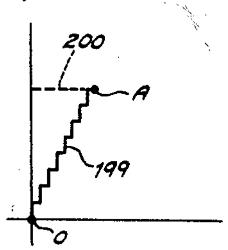
Figures 19, 20:
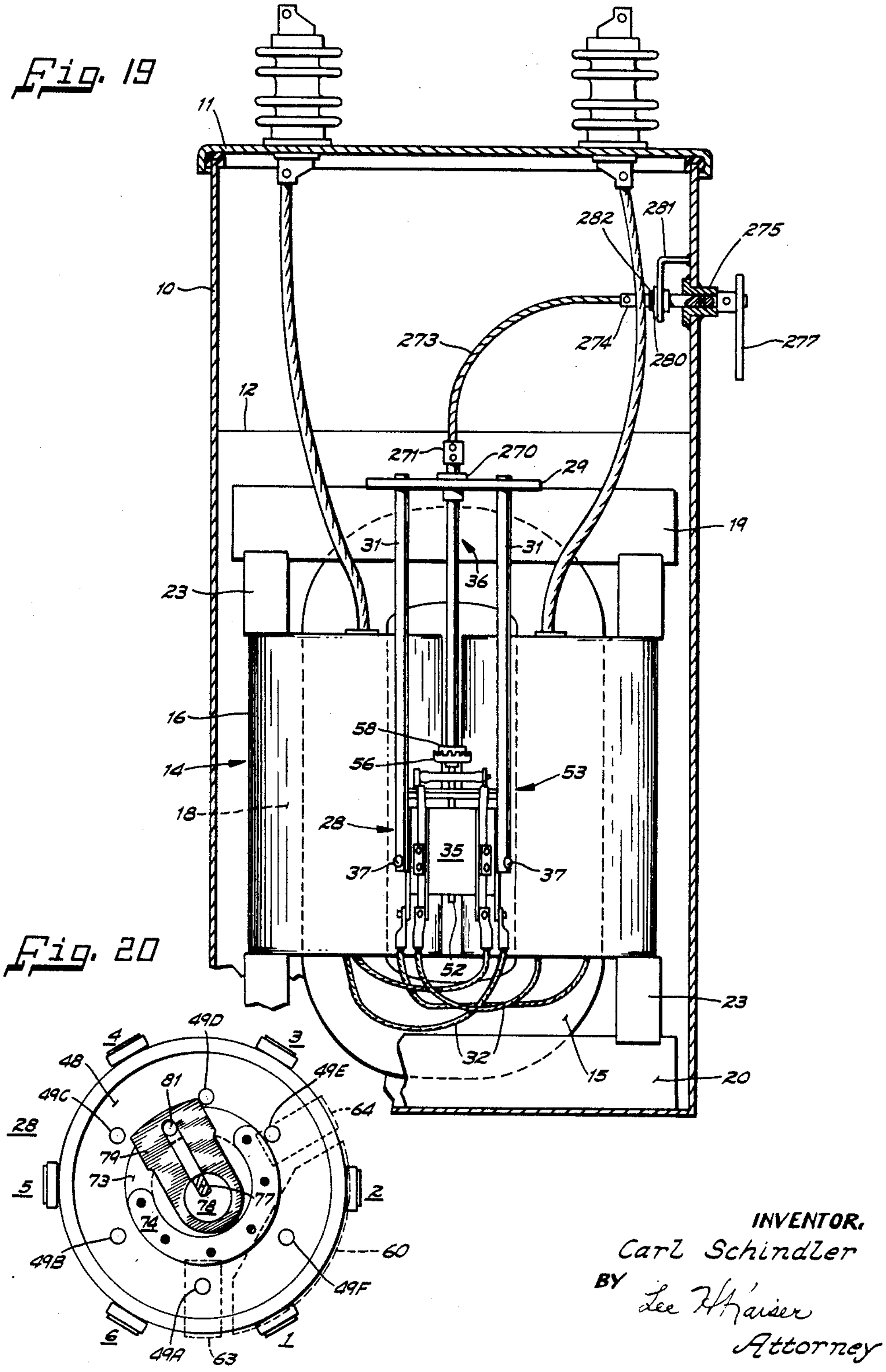

FIGS. 6A and 6B are horizontal views with certain parts omitted showing the initial position of the tap changer with FIG. 6A taken above the pawl along line 6A—6A of FIG. 4 and FIG. 6B taken below the pawl; FIGS. 6C and 6D are views similar to FIGS. 6A and 6B after rotation of the shaft through a sufficient angle to accomplish the tap change but before the tap change has occurred; and FIG. 6E is a view similar to FIG. 6A after a tap change has been accomplished;

FIG. 7A illustrates the position of the tap changer movable contact prior to a tap change; FIG. 7B illustrates the position during a tap change when the auxiliary contact means has shunted the current to the succeeding winding tap; FIG. 7C illustrates the position during the tap change wherein the movable contact has become disengaged from the preceding winding tap; FIG. 7D illustrates the position during the tap change wherein the movable contact has bridged the succeeding pair of stationary contacts but the auxiliary contact still engages the preceding stationary contact; and FIG. 7E illustrates the position after the tap change has been completed;

FIG. 8 is a front view of the electromagnetic vibratory pump and work cylinder assembly of the embodiment of FIG. 1 with the front wall of the housing cut away to better illustrate the parts;

FIG. 9 is a rear view of the electromagnetic pump and work cylinder assembly;

FIG. 10 is a vertical sectional view through the electromagnetic vibratory pump and work cylinder;

FIG. 11 is an enlarged view of the pumping and valving portion of FIG. 10;

FIG. 12 is a view of the work cylinder and compensating means looking toward the surface of the work cylinder casing which abuts against the electromagnetic pump;

FIG. 13 is a horizontal sectional view taken on line 13—13 of FIG. 10;

FIG. 14 is a horizontal sectional view taken on line 14—14 of FIG. 12;

FIG. 15 is a top view of the bandwidth adjustment bracket;

FIG. 16 is a side view of the feedback means taken along line 16—16 of FIG. 8;

FIG. 17 is a view plotting rotation of the operating shaft versus transformer secondary voltage and illustrating the operation of the voltage regulating apparatus;

FIG. 18 is a fragmentary view similar to FIG. 17 illustrating the operation of the invention;

FIG. 19 is a vertical view through a distribution, transformer having a manual on-load tap changer in accordance with the invention; and FIG. 20 is a partial view illustrating the limit means of the tap changer of FIG. 19.

Referring to the drawing, the invention will be described as embodied in a self-regulating electrical distribution transformer adapted to maintain the secondary, or load, voltage within a predetermined voltage bandwidth and including a metallic casing 10 sealed by a cover 11 and adapted to be mounted on an electrical power pole. Casing 10 is partially filled with a suitable insulating dielectric liquid 12 such as transformer oil in which a transformer core and coil assembly 14 is immersed. Core and coil assembly 14 includes a closed, rectangular magnetic core 15 preferably of continuous, spirally wound magnetic strip material and having opposed straight winding legs on which cylindrical primary coils 16 and secondary coils 18 are concentrically wound. The upper and lower yokes of the magnetic core 15 fit within upper and lower frame members 19 and 20 respectively of channel cross section which are connected by tie rods (not shown) to hold the magnetic core 15 and coils 16, 18 as a unitary assembly. Wood blocks 23 disposed between the frame members 19, 20 and the transformer coils 16, 18 prevent axial movement of the coils under short circuit forces.

The voltage regulating apparatus for maintaining the output voltage from the transformer core and coil assembly 14 within the desired voltage bandwidth includes a continuously energized electromagnetic motor and work cylinder assembly 25 enclosed within a hermetically sealed metallic housing 26 mounted on upper frame member 19 and a tap changer 28 mounted below housing 26. Housing 26 rests on a mounting plate 29 secured by bolts (not shown) to the top surface of upper frame member 19. The tap changer 28 is secured at three circumferentially spaced apart points to elongated vertical insulating spacers 31 which are affixed at their upper end by suitable means such as threaded studs 30 to mounting plate 29. As explained in detail hereinafter, tap changer 28 shunts the load current from one tap in the transformer primary to the next to change transformation ratio under load, i.e., while the transformer is energized, and in order to minimize the deterioration of the arcing contacts, tap changer 28 is preferably positioned so that the arcing contacts are disposed symmetrically relative to the coils on the two core winding legs and within the middle one third of the height of the coils. It has been discovered that so positioning the tap changer greatly reduces erosion and deterioration of the contacts due to arcing. It would further appear that this position of tap changer 28 relative to the transformer coils reduces the energy in the arc during a tap change. At this position of tap changer 28, the stray electromagnetic field from the end turns of the transformer coils 16, 18 may be at approximately right angles to the electromagnetic field from the current in the arc, and consequently a force may be exerted on the arc in a direction to lengthen the arc and thus lower the energy in the arc.

The transformer primary coil 16 preferably comprises two windings 16A and 16B (see the schematic circuit diagram of FIG. 7) one of which is wound on each of the opposed winding legs of magnetic core 15. Conductors 32 from three taps on each of the primary windings 16A and 16B are electrically connected to metallic support links 33 secured by rivets 34 (see FIG. 4) at circumferentially spaced apart positions to the outer periphery of a tubular insulating body member 35 of tap changer 28. A tap changer operating shaft 36 includes a first portion 36A (see FIG. 8) protruding through the base 101 of housing 26 and through mounting plate 29 and into the axial bore in a second, tubular, operating shaft portion 36B preferably of insulating material and connected to portion 36A by a transverse pin. Shaft portion 36B is operatively connected to tap changer 28 and rotatably driven by electromagnetic motor and work cylinder assembly 25 to accomplish the desired changes in transformation ratio as described hereinafter.

Tap changer 28 will be described first. The tubular insulating body 35 is affixed by suitable means such as screws 37 to the depending spacers 31 to position the tap changer 28 relative to the cylindrical transformer coils 16, 18 so that the arcing contacts are within the middle one third of the axial height of the coils. Six resilient stationary contacts 1–6 are mounted in circumferentially spaced apart relation about the outer periphery of tubular body 35 and are electrically connected by the conductors 32 to taps in the primary windings 16A and 16B. The primary winding portions 16A and 16B are isolated electrically and the taps 2–4–6 in one primary winding portion 16A are connected to alternate ones of the stationary contacts, i.e., to even-numbered stationary contacts 2–4–6 (see FIG. 7), and the taps 1–3–5 in the second primary winding portion 16B are connected to odd-numbered stationary contacts 1–3–5 between said alternate contacts. Each stationary contact includes an elongated, flexible contact spring 39 abutting against a supporting link 33 and extending parallel to the axis of tubular body 35 to a position above body 35 and carrying a contact button 40 on the upper end thereof. A spring steel backup spring 42 is disposed against the radially outward surface of each contact spring 39. A metallic spacer 43 is disposed outward from backup spring 42, and screws 44 extending through clearance holes in backup spring 42 and in contact spring 39 and threadably engaging tapped holes in supporting link 33 rigidly affix the lower end of the contact and backup springs 39 and 42 to the supporting link 33.

Resilient contact spring 39 together with backup spring 42 are adapted to exert a relatively high contact pressure in a radially inward direction against the movable contact of the tap changer 28. Contact spring 39 is moved in a radially outward direction relative to support link 33 when the movable tap changer contact is snapped into engagement with it, and contact spring 39 moves radially inward relative to support link 33 when disengaged from the tap changer movable contact. This movement of contact spring 39 in a radial direction relative to supporting link 33 acts in the manner of a pump to force oil from between these members in an axial direction into the path of the arc formed between the stationary contact button 40 and the tap changer movable contact. This oil pumping action between spring contact 39 and supporting link 33 enhances the current interrupting ability of the tap changer and reduces the erosion and deterioration of the contacts.

Contact button 40 is secured to contact spring 39 by a rivet 46. The end of rivet 46 extends radially beyond contact spring 39 to keep the free ends of contact spring 39 and backup spring 42 apart. Friction between the end of rivet 46 and backup spring 42 generates heat which dissipates a portion of the energy tending to cause vibration of contact spring 39, whereby contact bounce is reduced and erosion of the arcing contacts due to repeated arcs drawn during contact bounce is minimized.

As upper disk 48 preferably of insulating material is rigidly secured by suitable means such as cement to the inner periphery of the tubular body 35 adjacent the upper end thereof. A plurality of axially extending stop pins 49 arranged in a circle protrude through and are secured to upper disk 48 at circumferentially spaced apart points. A lower disk 51 preferably of insulating material is rigidly secured by suitable means such as cement to the inner periphery of tubular body 35 adjacent the lower end thereof.

The shaft 52 of tap changer 28 is rotatably mounted within axial openings in the upper disk 48 and lower disk 51. Shaft 52 rotatably carries the tap changer movable contact assembly 53, and retaining rings 55 fitting within circumferential grooves in shaft 52 prevent axial displacement of the shaft 52 relative to body portion 35 and also prevent axial displacement of the movable contact assembly 53 relative to shaft 52. An adjustment cup coupling member 56 having a plurality of upwardly extending, circumferentially spaced apart teeth is secured by a pin 57 to the upper end of rotatable shaft 52. Adjustment cup 56 receives a circular coupling member 58 carried by the lower end of operating shaft portion 36B, and a pin 59 extending transversely through the coupling member 58 and the lower end of tap changer operating shaft 36B is adapted to fit within diametrically opposed notches between the teeth of the adjustment cup member 56 to permit the operating shaft 36 to be adjustably secured in any of a plurality of angular positions relative to tap changer shaft 52. The coupling provided between member 56 and pin 59 facilitates calibration of the apparatus.

Shaft 52 carries, but is rotatable relative to, an assembly 53 including the tap changer movable contact, resilient means for snapping the movable contact between tap positions, and impedance means for limiting the energy in the arc during the tap change. The tap changer movable contact preferably is an arcuate member 60 of suitable high conductivity, arc resistant, metallic material such as copper-chrome alloy secured by rivets to an insulating plate 61 through which rotatable shaft 52 axially extends. Contact member 60 is of sufficient arcuate extent to bridge between adjacent stationary contact buttons 40 and is adapted to sequentially bridge between adjacent pairs of contact buttons 40, e.g., between the pair of adjacent stationary contacts 3 and 4 and subsequently between the pair of adjacent stationary contacts 2 and 3, when plate 61 is rotated. Two auxiliary contact members 63 and 64, which may be of the same material as arcuate contact 60, are secured by suitable means such as rivets to insulating plate 61 at positions circumferentially removed from the leading and trailing edges of arcuate contact member 60 and are spaced apart by approximately the same angle as alternate stationary contacts. Two resistors 65 and 66 for limiting the energy in the arc during the tap change are also carried by insulating plate 61. Resistors 65 and 66 have reduced diameter axially extending ends which protrude through apertures in mounting brackets 68 and 69 secured by suitable means such as rivets to insulating plate 61. Mounting bracket 68 is metallic and the terminals on one end of both resistors 65 and 66 are electrically connected to mounting bracket 68 to electrically common one end of resistors 65 and 66. The other end of resistor 65 is electrically connected by a conductor to auxiliary contact member 63 and the other end of resistor 66 is electrically connected by a conductor to auxiliary contact member 64.

Insulating plate 61 is secured by screws 71 to a metallic hub 72 having an axial opening through which shaft 52 protrudes. Rivets secure an outwardly extending circumferential flange on hub 72 to a metallic retainer disk 73 with a C-shaped spacer member 74 clamped therebetween. Shaft 52 extends through axial openings in hub 72 and retainer disk 73. A noncircular, or flat, portion 77 on shaft 52 in the radial plane of C-shaped spacer 74 receives a releasing member, or cam 78 having a rectangular opening corresponding to the flat portion 77 on shaft 52 so that cam 78 rotates with shaft 52. The exterior periphery of cam, or eccentric 78 is circular and fits within the circular opening in a holding member, or pawl 79. Pawl 79 is also in the radial plane of C-shaped spacer 74 and extends radially between the ends thereof to a position between adjacent, axially extending stop pins 49.

Pawl 79 has a radial slot 82 therein and is movable radially between a normal position wherein it engages one of the stops 49 to prevent rotation of movable contact 60 and a second position wherein it is disengaged from the stop 49 and movable contact 60 is free to rotate. An axially extending pin 81 protrudes through clearance apertures in hub 72 and in retainer member 73 and through the radial slot 82 in pawl 79. Inasmuch as pawl 79 is held between adjacent, axially extending stop pins 49, pawl 79 cannot rotate, and pin 81 fitting within the radial slot 82 in pawl 79 prevents hub 72, insulating plate 61, and the movable contact 60 from rotating when shaft 52 rotates. However, releasing member, or cam 78 rotates with shaft 52 and relative to holding member, or pawl 79 and retracts pawl 79 in a radially inward direction from its position between stop pins 49.

An arm 83 depends in an axial direction from retainer disk 73. A similar arm 84 depends in an axial direction from a dog 85 disposed below retainer member 73 and having a noncircular axial opening mating with flat portion 77 on shaft 52 so that dog 85 and arm 84 are operatively connected to and rotate with shaft 52. A tubular spacer 87 surrounds shaft 52 below dog 85, and a washer surrounds the shaft 52 below spacer 87. A helical torsion spring 90 surrounding spacer 87 has radially extending ends 91 and 92 which abut against opposite sides of depending arms 83 and 84 on retainer 73 and dog 85. Inasmuch as dog 85 rotates with shaft 52 while retainer member 73 is prevented from rotating by pawl 79 fitting between stop pins 49, it will be appreciated that rotation of shaft 52 will deflect one end 91 or 92 of spring 90 while the other end thereof is held stationary by depending arm 83 on retainer 73 and thus spring 90 will be loaded and will oppose rotation of shaft 52 with a force proportional to the angular rotation thereof.

FIGS. 6A through 6E illustrate the operation of the mechanism for actuating the tap changer movable contact from one tap position to the next. As illustrated in FIG. 6A, pawl 79 is between adjacent stop pins 49A and 49B, and pin 81, fitting within radial slot 82 in pawl 79 and in the apertures in retainer 73 and hub 72, prevents retainer member 73, insulating plate 61 rigid therewith, and arcuate contact 60 carried by plate 61 from moving as shaft 52 rotates. In this initial position, depending arms 83 and 84 on retainer member 73 and dog 85 respectively are in the same radial plane with ends 91 and 92 of torsion spring 90 on opposite sides of arms 83 and 84 as shown in FIG. 6B. FIG. 6C illustrates the elements after approximately 120 degrees of clockwise rotation of shaft 52 wherein cam 78 has rotated with shaft 52 and withdrawn pawl 79 from its position between stop pins 49A and 49B. At this position, arm 84 on dog 85 has deflected end 91 of torsion spring 90 through approximately 120 degrees in the clockwise direction as shown in FIG. 6D. While shaft 52 and arm 83 are held stationary, the entire movable contact assembly including pawl 79, hub 72, insulating plate 61, and arcuate contact 60 is snapped clockwise through sixty degrees under the force of loaded torsion spring 90 at optimum speed for efficient arc interruption to the next tap position shown in FIG. 6E. As the movable contact assembly is deflected by the force of torsion spring 90 in a clockwise direction relative to shaft 52, pawl 79 rotates relative to eccentric 78 and is thus moved radially outward relative to the axis of shaft 52 to a position between the next pair of stop pins 49B and 49C in the clockwise direction to bring the movable contact assembly to rest. In FIG. 6E it is illustrated that the voltage sensitive valve means has returned the shaft 52 and arm 84 to a null position corresponding to the transformer secondary voltage after the tap change.

It will be apparent that if shaft 52 is rotated in the counterclockwise direction from the initial position shown in FIG. 6A, depending arm 84 on dog 85 will deflect torsion spring end 92 in the counterclockwise direction while spring end 91 is held by depending arm 83 on retainer member 73. After approximately 120° counterclockwise rotation of shaft 52 and cam 78, pawl 79 will be withdrawn sufficiently from between stop pins 49A and 49B to permit the loaded torsion spring 90 to snap the entire movable contact assembly through sixty degrees to the next tap position in the counterclockwise direction. Shaft 52 is held stationary, and the entire movable contact assembly including arcuate contact member 60 and pawl 79 rotates relative to shaft 52 in moving to the next tap position, and pawl 79 in rotating relative to cam 78 is actuated radially outward and enters between stop pins 49A and 49F to bring the movable contact to rest in the next tap position.

FIGS. 7A through 7E schematically illustrate the means for shunting the load current to the succeeding winding tap, for limiting the circulating current during the interval that the succeeding and the preceding winding taps are bridged, and for reducing the arcing during the tap change. Three taps 2, 4 and 6 on primary winding 16A on one core winding leg are connected to even-numbered stationary contacts 2, 4 and 6 and three taps 1, 3 and 5 on primary winding 16B on the other winding leg of magnetic core 15 are connected to odd-numbered stationary contacts 1, 3 and 5. As shown in FIG. 7A, arcuate contact 60 bridges between stationary contacts 3 and 4 to complete a circuit through winding 16A to tap 4, conductor 32A, stationary contact 4, arcuate contact 60, stationary contact 3, conductor 32B, tap 3 on winding 16B, and the remainder of primary winding 16B. At this position the portion of winding 16A between taps 4 and 2 and the portion of winding 16B between taps 1 and 3 are out of the circuit and further the resistors 65 and 66 are also out of the circuit and do not carry current. It will be apparent that when arcuate contact 60 bridges the pair of stationary contacts 1 and 2, all of windings 16A and 16B will be in the circuit and the ratio of transformation of the transformer will be a maximum. Further, it will be apparent that when the pair of adjacent stationary contacts 6 and 5 are bridged by arcuate contact 60, all of primary winding 16A between taps 6 and 2 and all of primary winding 16B between taps 1 and 5 will be out of the circuit and the ratio of transformation will be a minimum.

In FIG. 7B it is illustrated that insulating plate 61 has been rotated sufficiently in a clockwise direction by torsion spring 90 to bring auxiliary contact 63 into engagement with stationary contact 2, thereby shunting the current from preceding tap 4 to succeeding tap 2 in winding 16A and assuring a path between taps 2 and 3 through resistor 65 before arcuate contact 60 is disengaged from stationary contact 4. Consequently, flickering of lights in the load served by the transformer will be minimized. It will be appreciated that resistor 65 limits the circulating current during the interval that succeeding tap 2 and preceding tap 4 are bridged. In FIG. 7C it is illustrated that insulating plate 61 has rotated sufficiently in a clockwise direction so that arcuate contact 60 has left preceding stationary contact 4. However, auxiliary contact 64 on insulating plate 61 is now in engagement with preceding stationary contact 4, thereby shunting resistor 66 directly across the arc so that resistor 66 carries part of the load current and reduces the arcing and erosion of the contacts. In the position shown in FIG. 7D arcuate contact 60 has been rotated into engagement with succeeding stationary contact 2 to connect the portion of winding 16A between taps 2 and 4 directly into the circuit. However, resistor 66 is still shunted across stationary contacts 3 and 4, and an arc is drawn when the auxiliary contact 64 leaves stationary contact 4 and the movable contact is actuated toward its final position at rest as shown in FIG. 7E. However, this arc between stationary contact 4 and auxiliary contact 64 is in series with resistor 66, so consequently the energy in the arc is relatively low and the arc is easily interrupted.

It will be appreciated that the elements function in a sequence which is reversed from that described when the tap changer movable contact is rotated in the counterclockwise direction, but the desired reduction of arcing, shunting of load current to the succeeding winding tap, and minimizing of contact erosion is accomplished in either direction of rotation, and the operation of the tap changer in the counterclockwise direction of rotation will not be described.

Housing 26 encloses a unitary electromagnetic pump and work cylinder assembly 25 for rotatably driving operating shaft 36 to actuate tap changer 28 to change the transformation ratio and thus maintain the secondary voltage of the transformer within the desired voltage bandwidth. Housing 26 includes a hollow, rectangular-in-cross-section, metallic body 100 hermetically sealed by suitable means such as soldering at its lower end to a metallic base 101 and at its upper end to a metallic cover 102. A suitable hydraulic fluid 103 having good electrical insulating qualities fills housing 26 to a level above the pump and work cylinder assembly 25. The electromagnetic vibratory pump within housing 26 includes a pump body portion, or housing, 104 of suitable magnetic material such as steel having a vertical compartment 105 therein. An operating winding 107 wound on an insulating spool 108 is disposed within vertical compartment 105. The leads (not shown) from winding 107 are connected to terminals on insulating bushings 109 extending through and secured in sealing relation to the sidewall of metallic body 100. Spool 108 rests on a washer 110 of suitable magnetic material such as steel which is disposed above a coil support 111 of suitable nonmagnetic material such as bronze. Coil support 111 and an elongated mounting plate 112 for the electromagnetic pump are secured to the pump body portion 104 by screws 114. Mounting plate 112 is supported at its ends on shoulder studs 115 which extend through apertures in housing base 101 and are secured to base 101 by suitable means such as soldering around the periphery of stud 115 to assure a hermetic sealing of housing 26.

The walls of pump body portion 104 together with steel washer 110 comprise an electromagnetic field structure, or pole structure, provided with an energizing winding 107. An elongated cylindrical armature 116 of suitable magnetic material such as steel disposed within the axial opening in spool 108 is adapted to be magnetically suspended in a mean position within the pole structure when the alternating current voltage from the transformer secondary coil is impressed on the terminals of insulating bushings 109 and thus on energizing winding 107, and armature 116 is arranged to vibrate longitudinally about this mean position due to the cyclic fluctuations of the magnetic flux in the pole structure.

Pump housing 104 has a vertical aperture 118 therein coaxial with compartment 105. A tubular sleeve bushing 119 is pressed into aperture 118. Sleeve bushing 119 defines a vertical cylinder 120 which at its lower end flares conically outward and registers with a transverse horizontal aperture 122 in pump housing 104. An elongated pumping piston rod 123 preferably of suitable metallic material having exceptional wear-resisting ability such as stainless steel extends coaxially through armature 116 and is rigidly affixed thereto. The upper end of pumping piston rod 123 is disposed in cylinder 120 and the lower end thereof slidably reciprocates within an axial aperture in coil support member 111. A valving piston rod 125 is disposed within the upper end of cylinder 120 and together with pumping piston rod 123 defines a pumping chamber 126 in cylinder 120.

Valving piston rod 125 and armature 116 are resiliently connected together, and a weight 127 of sufficient mass is secured to valving piston rod 125 to prevent it from vibrating with armature 116 due to the cyclic pulsations of the magnetic flux in the pole structure. A plurality of superimposed resonant leaf springs 128 preferably of spring steel are connected at their midportion to the lower end of armature 116. Each leaf spring 128 has an aperture in the center thereof through which pumping piston rod 123 protrudes, a helical spring 129 surrounds rod 123 beneath the leaf springs 128, and a snap ring 130 fits in a circumferential groove in pumping piston rod 123 below the helical spring 129. This construction permits the leaf springs 128 to be held against armature 116 with a controlled force. The mass of the vibratory armature 116 and pumping piston rod 123 and the spring rate of the leaf springs 128 are selected to provide mechanical resonance at the frequency of the alternating current pulsations. The plurality of leaf springs 128 urged by helical spring 119 against the bottom surface of armature 116 provide a resilient connection between armature 116 and weight 127 and have an almost infinite life even though they are flexed continuously at the frequency of the pulsations of the alternating current. The leaf springs 128 have been found to withstand breakage even after they have been flexed billions of times.

The ends of resonant leaf springs 128 are secured to vertical posts 132 of U-shaped weight 127 which is affixed to valving piston rod 125. In order to prevent localized stress of springs 128 adjacent the point they are secured to posts 132, the lower ends of posts 132 are rounded, spring washers 133 are positioned beneath the leaf springs 128, and screws protruding through the spring washers 133 and the leaf springs 128 are threaded within tapped holes in the lower ends of posts 132. The upper ends of posts 132 are secured by pins 136 to the crossbar 135 of the U-shaped weight 127.

A universal connection is provided between cross bar 135 and valving piston rod 125 to assure that valve rod 125 does not bind in cylinder 120. The upper end of valving piston rod 125 has a press fit with a ball 138 of suitable bearing material such as bronze. Valve rod 125 with ball 138 secured thereto are positioned within a vertical aperture 139 in cross bar 135, and sleeve retainers 140 are disposed in aperture 139 above and below ball 138. The retainers 140 are preferably of a relatively resilient material such as polytetrafluoroethylene having excellent bearing and sound-reducing qualities with ball 138, and the surfaces of sleeve retainers 140 facing ball 138 are counterbored conically to provide a seat for ball 138. A flat, elongated retaining spring 142 secured beneath cross bar 135 by snap rings 143 disposed beneath the ends of spring 142 and fitting within circumferential grooves in posts 132 urges the lower retainer 140 toward upper retainer 140 with ball 138 therebetween. This construction connects valving piston rod 125 to weight 127 with a controlled force.

An outlet passage 145 in pump housing 104 registers with pumping chamber 126. Outlet passage 145 includes a horizontal portion 145A defined by an outlet check valve tubular bushing 146 pressed into a horizontal aperture in pump housing 104, a vertical slot 145B in the surface of pump housing 104, and a horizontal opening 145C registering with cylinder 120 at a point spaced axially from pumping chamber 126. Outlet valve tubular bushing 146 has a reduced diameter portion which forms a seat for a ball valve 148 preferably of material having exceptionally high wearing qualities such as polytetrafluoroethylene and resiliently urged to closed position by a helical spring 149 surrounding a pin 150 in the axial opening in tubular bushing 146. Pin 150 is secured to an outlet valve cover 147 affixed to pump housing 104 by screws 164 and partially defining the vertical portion 145B of the outlet passage.

The end of pumping piston rod 123 within cylinder 120 has an axial bore 152 which defines the inlet passage to pumping chamber 126. A seat is provided at the end of pumping piston rod 123 for an inlet ball valve 153 of a material having exceptionally high wearing qualities such as polytetrafluoroethylene. A wire loop through ball valve 153 is secured to a helical spring 154 within axial bore 152. Spring 154 at its other end is secured to a wire 155 extending through a transverse hole in pumping piston rod 123, and spring 154 normally holds ball valve 153 against its seat. An inlet aperture 157 through the wall of hollow pumping piston rod 123 registers with axial bore 152 and also communicates with the conically flaring portion of cylinder 120. On the upstroke of pumping piston rod 123, ball valve 153 is forced against its seat and outlet ball valve 148 is forced open to deliver liquid into outlet passage 145. On the downstroke of pumping piston rod 123, outlet valve 148 closes and a partial vacuum is created in pumping chamber 126, thereby lifting inlet ball valve 153 off its seat and forcing liquid through inlet aperture 157 and axial bore 152 into pumping chamber 126. Preferably the axial dimension of pumping chamber 126 defined by the spacing between pumping piston rod 123 and valving piston rod 125, when no voltage is impressed on winding 107, is not more than several times the stroke of pumping piston rod 123. This construction assures that the pump is always self-priming and is disclosed in detail and claimed in my U.S. Patent 3,018,735 having the same assignee as the present application.

Pumping piston rod 123, armature 116, resonant springs 128, posts 132, cross bar 135, and valving piston rod 125 constitute a unitary assembly 151 magnetically suspended in the pole structure in a mean position determined by the magnetic flux in the pole structure. Armature 116 and pumping piston rod 123 are adapted to vibrate longitudinally in response to the fluctuations of the magnetic flux in the pole structure and to advance pumping piston rod 123 into and retract it from pumping chamber 126 to thereby pump liquid into outlet passage 145. Horizontal delivery passages 159 and 160 in pump housing 104 register with cylinder 120 above and below outlet passage portion 145C, and an increased diameter portion, or valve, 161 on valving piston rod 125 is adapted to selectively deliver liquid from outlet passage 145 into delivery passages 159A and 160A in accordance with the mean position of the unitary assembly 151 including valving piston rod 125.

The casing 162 of a work cylinder 163 is rigidly secured to the pump housing 104 by screws 164 passing through clearance apertures in the valve body 147 and in pump housing 104 and threadably engaging tapped holes in work cylinder casing 162. A piston 166 reciprocable within work cylinder 163 has ends 167 spaced apart axially of work cylinder 163. Cover plates 169 secured to the ends of work cylinder casing 162 by screws 170 with gaskets 171 clamped therebetween seal the ends of work cylinder 163 against leakage of hydraulic liquid 103. Circumferential grooves in the piston ends 167 receive therein packing washers 193 of U-shaped cross section and held within the grooves by helically wound closed springs 194 to seal the left hand end of work cylinder 163 from the right hand end. A passage 195 in work cylinder casing 162 communicating at one end with hydraulic liquid 103 in housing 26 and normally communicating with the portion of work cylinder 163 between piston ends 167 is exposed when piston 166 is at each end of its travel to permit escape of the hydraulic fluid from the work cylinder 163. Consequently the electromagnetic motor pumps against substantially zero head when piston 166 is at the ends of its travel.

Delivery passages 159 and 160 connect cylinder 120 to the left and right ends of work cylinder 163. Delivery passage 159 between cylinder 120 and the left end of work cylinder 163 includes a horizontal opening 159A in pump housing 104, a generally horizontal slot 159B in the surface of work cylinder casing 162 abutting against pump housing 104, and a horizontal opening 159C in casing 162 communicating at one end with slot 159B and at the opposite end with the left end of work cylinder 163. Delivery passage 160 includes the horizontal opening 160A in pump housing 104, a generally horizontal slot 160B in the surface of work cylinder casing 162 abutting against pump housing 104, and a horizontal opening 160C in casing 162 communicating at one end with slot 160B and at the opposite end with the right end of work cylinder 163.

When the transformer secondary voltage impressed on winding 107 is at the nominal value, valve 161 on valving piston rod 125 is symmetrically disposed relative to outlet passage 145C and to delivery passages 159A and 160A, equal hydraulic pressures are exerted on the left and right ends of work cylinder piston 166, and no movement of piston 166 occurs. When the transformer secondary voltage is above the predetermined value at the middle of the voltage bandwidth, the unitary assembly 151 including valving piston rod 125 is raised to a position where valve 161 directs liquid from outlet passage 145C into delivery passage 160A and into the right hand end of work cylinder 163. As piston 166 is displaced to the left, liquid from the left hand end of work cylinder 163 returns through delivery passage 159 and is directed by an increased diameter portion 173 on valving piston rod 125 into an exhaust passage 174 in pump housing 104. Sleeve bushing 119 is formed with a reduced diameter portion 175 on the upper end thereof forming an annular passage permitting the liquid to flow from the exhaust passage 174 into the liquid 103 in housing 26. Similarly, when the transformer secondary voltage impressed on winding 107 is below the nominal value, valve 161 directs the liquid from outlet passage 145C into delivery passage 159A which communicates with the left hand end of work cylinder 163. Liquid returning from the right hand end of the work cylinder 163 as piston 166 is displaced to the right returns through delivery passage 160 and is directed by increased diameter portion 177 on valving piston rod 125 into an exhaust passage 178A in pump housing 104. Exhaust passage 178A communicates with a horizontal slot 178B in the surface of work cylinder casing 162 which abuts against pump housing 104. Horizontal slot 178B communicates with the liquid 103 in housing 26 and thus exhausts the liquid from the right hand end of work cylinder 163.

A rack 180 within work cylinder 163 is secured to work cylinder piston 166 intermediate the ends 167 thereof. A pinion 182 within work cylinder 163 and meshing with rack 180 between the ends 167 of piston 166 is carried by the operating shaft 36. Operating shaft portion 36A protrudes through a bushing 184 fitting within an aperture in housing base 101 and having a circumferential flange 185 soldered to base 101 around the periphery of flange 185. Bushing 184 has a cylindrical compartment formed therein filled with packing washers 187 of U-shaped cross section (see FIG. 10) surrounding shaft 36A in alternate layers with expanding brass washers 188 also surrounding shaft 36A. A sealing spring 190 surrounding operating shaft portion 36A and compressed between a pin 191 extending transversely through operating shaft 36 and the alternating layers of packing washers 187 and expanding washers 188 provides a hermetic seal between operating shaft portion 36A and bushing 184. A vertical aperture 196 in work cylinder housing 162 receives two tubular bearings 197 of suitable bearing material such as bronze which surround operating shaft 36 above and below pinion 182 and are secured in place by set screws 198 threadably engaged within tapped holes in work cylinder casing 162.

Self-adjusting feedback means are provided between the output shaft 36 and the voltage sensing direction-controlling means to compensate the voltage sensing means in accordance with the rotation of output shaft 36 in either direction within the voltage bandwidth to accomplish a tap change. The feedback means brings the hydraulic force tending to actuate the work cylinder piston 166 in one direction into balance with the force of torsion spring 90 tending to return piston 166 in the opposite direction after the piston 166 has been displaced a distance proportional to the departure of the transformer secondary voltage from the nominal value. The feedback means thus permits the work cylinder piston 166 and output shaft 36 to assume a neutral, or null, position at any voltage between the upper and lower bandwidth limits after being displaced through an amplitude proportional to the voltage departure. If a transformer secondary voltage change occurs within the voltage bandwidth, the tap changer shaft 52 is thus rotated in a direction to accomplish a tap change but is brought to rest at a null position by the compensating means and no tap change occurs until the voltage actually departs beyond the bandwidth limits. Each position of work cylinder piston 166 within work cylinder 163 corresponds to a predetermined transformer secondary voltage. The compensating means thus eliminates hunting and "overshooting" and permits the apparatus to integrate departures of voltage from the nominal value with respect to both time and the magnitude of the voltage departure.

In FIGS. 17 and 18 voltage is plotted as ordinates and angular rotation of operating shaft as abscissae to illustrate the operation of the invention. The upper bandwidth limit is represented to be 122 volts and the lower bandwidth limit to be 118 volts. Variation in transformer secondary voltage from the nominal value results in change of the vertical position of unitary assembly 151 including valve 161 and delivery of liquid into one end of work cylinder 163. Assume that the voltage changes by 0.5 volt from 120 to 120.5 volts. The unitary assembly 151 and valve 161 rise and liquid is delivered into delivery passage 160 and into the right end of work cylinder 163. The pump delivers a minute quantity of hydraulic fluid on each stroke into the right end of work cylinder 163 and thus displaces the piston 166 in small steps and rotates operating shaft 36 in small angular steps. Assuming that the 0.5 voltage rise is a linear gradual variation, it may be represented as shown at 199 in FIG. 18 that the angular rotation of operating shaft occurs in small steps until the compensating feedback means brings the operating shaft 36 to rest at a neutral position A. If, on the other hand, the 0.5 volt change occurs instantaneously, it may be represented as shown at 200 in FIG. 18 that the angular rotation of operating shaft 36 occurs in small steps until the compensating means brings the operating shaft to rest at neutral position A. An inherent time delay is thus accomplished in actuating operating shaft 36 by an amount proportional to the voltage change.

If no compensating means were provided, the vibratory pump would continue to displace piston 166 and rotate tap changer shaft 52 through the approximately 120 degrees required to effect a tap change even though the transformer secondary voltage of 120.5 volts was still within the voltage bandwidth. The compensating feedback means changes the vertical forces acting on the unitary magnetically suspended assembly 151 in a direction to bring valve 161 to a position wherein the force acting on the right side of work cylinder piston 166 due to liquid being pumped past valve 161 into delivery passage 160 is equal to the force exerted by torsion spring 90 tending to return the piston 166 in the opposite direction. The piston 166 and operating shaft 36 are thus brought to rest in a neutral, or null, position wherein the hydraulic force tending to displace work cylinder piston 166 in one direction is balanced by the torsion spring force tending to move it in the opposite direction. Inasmuch as the piston 166 and shaft 152 are actuated with an inherent time delay in a direction to accomplish a tap change but are brought to rest in a null position as long as the voltage has not departed beyond the bandwidth limits, it will be appreciated that the disclosed construction integrates voltage departures with respect to both time and the magnitude of the voltage departure and responds to the average of all preceding voltage departures. Within the voltage bandwidth any voltage variation will result in shaft rotation proportional thereto, and the solid line graph 260 of FIG. 17 plotting transformer secondary voltage against angular rotation of operating shaft 36 from initial position approximates a straight line relation. A change of voltage from 120 to 120.5 volts will rotate operating shaft 36 clockwise through approximately ten degrees until the feedback compensating means returns the unitary assembly 151 to a position corresponding to the neutral position shown at A in FIG. 17 where the hydraulic force urging work cylinder piston 166 in one direction is balanced by the torsion spring force. A further 0.5 volt rise of transformer secondary voltage from 120.5 to 121 volts will again displace piston 166 to effect ten degree clockwise rotation of operating shaft 36, and the feedback means will change the position of unitary assembly 151 and valve 161 in accordance with the rotation of shaft 36 to bring piston 166 and shaft 36 to a null position indicated at B in FIG. 17 wherein the opposed hydraulic and torsion spring forces acting on piston 166 are balanced.

The position of the valve 161 is thus controlled by both the feedback means and the transformer secondary voltage. Variation of transformer secondary voltage incident to a tap change varies the magnetic flux which in turn changes the position of valve 161 at a "rate" which may be expressed in units of valve displacement per unit voltage variation. Rotation of shaft 36 incident to voltage variation actuates the feedback means to also change the valve position at a "compensating rate" in units of valve displacement per unit voltage variation, and in accordance with the invention, the "compensation rate" is substantially equal to the rate at which the position of the valve 161 is changed by the magnetic flux in the pole structure incident to a change in transformer secondary voltage. In other words, if voltage variation incident to a tap change varies the position of valve 161 one unit per volt variation of transformer secondary voltage, the compensation rate of the feedback means is such that rotation of output shaft 36 incident to one volt variation of transformer secondary voltage actuates the feedback means to also change the position of the valve means one unit. In the preferred embodiment both the magnetic flux and the compensating springs 212 exert a vertical force on the magnetically suspended valve means, and the compensating rate, i.e., ratio of change of compensating spring deflection by the feedback means to the variation in voltage rotating the shaft 36 to accomplish the change of deflection, is substantially equal to the rate at which the deflection of the compensating springs 212 is changed by the magnetic flux incident to a change in transformer secondary voltage.

The mechanical feedback, or compensating means will now be described. A metallic collar 201 is secured to operating shaft 36 below bearing 197 exterior of work cylinder casing 162. A compensating screw 202 having an axial clearance aperture and an external thread is circumjacent operating shaft 36 below collar 201. Compensating screw 202 is operatively connected to operating shaft 36 for rotation therewith by a friction clutch in the form of smooth surfaces on the mating faces of compensating screw 202 and collar 201 and a helical spring 203 urging compensating screw 202 against collar 201. Helical spring 203 surrounds operating shaft 36 and is compressed between a washer disposed against the lower surface of compensating screw 202 and a washer which abuts against pin 191 extending transversely through operating shaft 36. An elongated horizontal compensating bar 204 having a tapped aperture intermediate its ends threadably engages the external thread on compensating screw 202. Depending pins 205 secured to the lower surface of work cylinder casing 162 prevent compensating bar 204 from turning. An H-shaped bracket 206 (see FIG. 13) having both the legs 207 and the cross-piece 208 thereof disposed in an approximately horizontal plane is pivotally mounted on the compensating bar 204. Each leg 207 of the bracket 206 has an aperture intermediate the ends thereof through which protrudes a stud 211 threaded within a tapped hole in the end of compensating bar 204 to pivotally mount H-shaped bracket 206 so that it can tilt at different angles.

One end of each leg 207 of bracket 206 is formed with a hole which receives the lower hook-shaped end of a helical compensating spring 212. The upper hook-shaped end of each compensating spring 212 engages one end of a horizontal elongated support spring 213 of suitable bimetallic material. The midportion of support spring 213 is secured to crossbar 135 of the weight 127 by screws 215 extending through clearance apertures in a spacer link 216 disposed between spring 213 and crossbar 135 and threadably engaging tapped holes in cross bar 135. Compensating springs 212 thus exert a vertically downward force on the unitary magnetically suspended assembly 151.

Variations in resistance of wire in energizing winding 107 with temperature, variations of permeability of the steel of the pole structure with temperature, and variaions in viscosity of hydraulic fluid 103 with temperature change the vertical position of the magnetically suspended assembly 151 from that which is assumed at the temperature at which the apparatus was calibrated. The deflection of bimetallic support spring 213 due to temperature change is in a direction to vary the vertical force exerted by compensating springs 212 on the magnetically suspended assembly 151 so that it will return the assembly 151 to its initial position and thus compensate for changes in the magnetic flux in the pole structure and for liquid viscosity changes resulting from temperature variation.

The other end of each leg 207 of bracket 206 is formed with an opening 219 (see FIG. 16) which receives one end of a horizontal rod 220 having a tapped aperture intermediate its ends. A vertical adjusting rod 224 has an external thread at its lower end engaged within the tapped aperture in rod 220. Spring clips 225 secured to work cylinder casing 162 by screws vertically mount adjusting rod 224 and frictionally hold it in calibrated position. The upper end of adjusting rod 224 protrudes through an aperture 228 (see FIG. 10) in a circular cover pad 229. Pad 229 extends through an opening in housing cover 102 and is secured by solder around its periphery to housing cover 102. Pad 229 also includes an axial aperture 230 for filling housing 26 with hydraulic fluid 103. Aperture 228 is counterbored to provide a circumferential groove which receives an O-ring gasket 233 to provide a seal between pad 229 and adjusting rod 224. A cover plate 234 secured by screws to pad 229 seals filling hole 230.

Compensating screw 202, compensating bar 204, bracket 206, and compensating springs 212 comprise the self-adjusting feedback means between the output shaft 36 and the voltage sensing means which eliminates hunting and permits the voltage regulating apparatus to be a null seeking, or neutral seeking device. At each neutral, or null, position the piston 166 is brought to rest when the tension in compensating springs 212 is changed sufficiently so that unitary assembly 151 and valve 161 are actuated to a position wherein the force on one end of piston 166 resulting from pumping liquid past valve 161 into one end of work cylinder 163 is balanced by the force exerted by loaded torsion spring 90 on shaft 52 tending to displace the piston 166 in the opposite direction. Each voltage within the bandwidth has a corresponding neutral position represented by a corresponding displaced position of the piston 166 within work cylinder 163 and a corresponding position of angular rotation of operating shaft 36. A variation of 0.5 volt from one null position voltage changes the height of the magnetically suspended assembly 151 and displaces piston 166 sufficiently to effect approximately ten degree rotation of operating shaft 36. For example, a drop of transformer secondary voltage impressed on winding 107 from an initial voltage of 120 volts to 119.5 volts lowers the magnetically suspended assembly 151 sufficiently so that valve 161 directs liquid from outlet passage 145 into the left end of work cylinder 163 to displace piston 166 to the right and rotates operating shaft 36 approximately ten degrees in the counterclockwise direction.

Counterclockwise rotation of compensating screw raises compensating bar 204. H-shaped bracket 206 is pivotally mounted intermediate the end of bracket legs 207 on compensating bar 204. Since the right hand end of bracket legs 207 is held stationary by rod 220 and adjusting screw 224, raising the compensating bar 204 upon which the bracket 207 is pivotally mounted has the effect of raising the ends of bracket legs 207 secured to compensating springs 212. This unloads compensating springs 212 sufficiently, and thus decreases the downward force exerted by compensating springs 212 on the magnetically suspended unitary assembly 151 sufficiently, to raise valving piston 125 to a position wherein the force on the left end of piston 166 resulting from pumping liquid past valve 161 is balanced by the force in loaded torsion spring 90 tending to return piston 166 in the opposite direction. This neutral position at 119.5 volts is indicated at C in FIG. 17.

If the transformer secondary voltage impressed on winding 107 should drop another 0.5 volts from 119.5 volts to 119 volts, the magnetically suspended assembly 151 would again drop and lower valve 161 to the position wherein liquid from outlet passage 145 is delivered into delivery passage 159 and the left hand end of work cylinder 163 to displace piston 166 sufficiently further to the right to rotate operating shaft 36 and compensating screw 202 counterclockwise through ten degrees. Counterclockwise rotation of compensating screw 202 again raises compensating bar 204 and decreases the vertical force exerted by compensating springs 212 on the magnetically suspended assembly 151 so that valve 161 can return to a position wherein the force on the left end of piston 166 resulting from pumping liquid past valve 161 is balanced by the force in loaded torsion spring 90 tending to return piston 166 in the opposite direction. This neutral position at 119 volts is indicated at D in FIG. 10.

If the voltage should then raise by 1.5 volts to 120.5 volts, the magnetically suspended assembly 151 and valve 161 would be raised sufficiently to permit liquid to be pumped from outlet passage 145 into delivery passage 160 and the right end of work cylinder 163 so that piston 166 would be displaced to the left back to and beyond its central position is work cylinder 163, and operating shaft 36 and compensating screw 202 would be rotated through thirty degrees in the clockwise direction to lower the end of bracket legs 207 secured to compensating springs 212 and to increase the vertical force exerted on magnetically suspended assembly 151 so that valving piston rod 125 and valve 161 would assume a position corresponding to the null position indicated at A in FIG. 17 wherein the opposed hydraulic and torsion spring forces acting on piston 166 are balanced.

It will thus be seen that operating shaft 36 and tap changer shaft 52 are rotated approximately ten degrees for each 0.5 volt departure of the transformer secondary voltage from nominal 120 volt value and will remain stationary in this neutral position. If we assume another 0.5 volt change in transformer secondary voltage from one neutral position voltage, the operating shaft 36 and tap changer shaft 52 will again rotate through ten degrees and remain stationary in a new neutral position. In the preferred embodiment of the invention, a three volt change in the transformer secondary voltage is effected each time a tap change is accomplished by tap changer 28. Further, the disclosed apparatus compensates for a three volt change in transformer secondary voltage whenever operating shaft 36 has been rotated sixty degrees. Sixty degrees is the "resultant" angle of rotation of shaft 52 to actuate tap changer 28 through one tap position, i.e., approximately 120 degrees to disengage pawl 79 from stop pins 49 minus 60 degrees rotation of shaft 52 in the opposite direction to return arm 84 and spring end 91 or 92 to the initial position. If torsion spring 90 is not unloaded an addtional rotation of shaft 52 through sixty degrees in the same direction will effect a second change of taps. Inasmuch as the compensation rate of the feedback means is substantially equal to the rate at which the position of valve 161 is varied by change of magnetic flux incident to a tap change, valve 161 will again be actuated to a position after the tap change wherein the hydraulic and torsion spring forces acting on piston 166 are balanced. However, the position of piston 166 within work cylinder 163 after the tap change corresponding to a given voltage will be displaced from its position corresponding to this voltage prior to the tap change.

Rotation of adjusting rod 224 raises or lowers rod 220 and thus raises or lowers the end of bracket legs 207 affixed to rod 220. The rotation of adjusting rod 224 varies the tension in compensating springs 212 and changes the nominal magnitude of the voltage at the middle of the voltage bandwidth required to magnetically suspend unitary assembly 151 so that valve 161 is symmetrically disposed relative to delivery passages 159 and 160. For example, it is possible by rotating adjusting rod 224 to calibrate the apparatus so that the voltage at the middle of the bandwidth is 123 volts.

If transformer secondary voltage should drop from the initial value of 120 volts to 118.5 volts, piston 166 will be displaced sufficiently to the right to effect thirty degrees counterclockwise rotation of operating shaft 36 and shaft 36 will remain in this neutral position indicated at E in FIG. 17. A rise of transformer secondary voltage to 120 volts would return piston 166 and shaft 36 to initial position. However, a drop of transformer secondary voltage below 118 volts will cause tap changer 28 to snap arcuate contact 60 to the next tap position wherein it short circuits between stationary contacts 4 and 5. This removes the portion of the primary winding 16B between taps 3 and 5 from the circuit and raises the transformer secondary voltage to approximately 121 volts.

Voltage bandwidth adjusting means are provided to disable the feedback means after rotation of shaft 36 from initial position through a predetermined angle. The angle through which the shaft 36 is rotated in either direction from initial position to disable the feedback means is adjustable but it preferably is more than half the "resultant" angle necessary to actuate tap changer 28 to the succeeding tap position, i.e., more than thirty degrees. This assures that the feedback means compensates for a three volt change each time a tap change occurs. A radially extending pin 238 secured to compensating screw 202 is disposed midway between a vertical stop pin 239 affixed to compensating bar 204 and the depending arm 240 on an L-shaped adjusting bracket 241 when the voltage is at the nominal value. Bracket 241 can be adjustably secured by a screw 242 to work cylinder casing 162 in any of a plurality of angularly varying positions to permit adjustment of the spacing between stop pin 239 and depending arm 240, and thus permit adjustment of the angle through which radial arm 238 on compensating screw 202 must rotate from its position midway between stop pin 239 and arm 240 before it engages one of these members. Adjusting bracket 241 provides one means of adjusting the voltage bandwidth. Bracket 241 has an aperature through which vertical rod 224 protrudes and an arcuate slot 244 (see FIG. 15) through which mounting screw 242 extends. It will be apparent that loosening of screw 242 will permit manual rotation of adjusting bracket 241 about rod 224 to vary the spacing between stop pin 239 and depending arm 240 on bracket 241.

Preferably approximately forty degree rotation of operating shaft 36 and compensating screw 202, incident to a two volt drop from the initial value to 118 volts indicated at F in FIG. 17, will rotate operating shaft 36 and compensating screw 202 sufficiently in a counterclockwise direction so that radial pin 238 comes into interfering relation with stop pin 239, thereby preventing further rotation of compensating screw 202. The friction clutch formed between mating surfaces of collar 201 and compensating screw 202 will then permit shaft 36 to rotate further in a counterclockwise direction while compensating screw 202 is held stationary by stop pin 239. Inasmuch as compensating screw 202 can no longer turn in a direction to raise the end of bracket legs 207 secured to compensating spring 212 to reduce the vertical force on the magnetically suspended unitary assembly 151, upon a drop of voltage below 118 volts the feedback means will be disabled and the magnetically suspended assembly 151 and valve 161 will not be returned to a neutral position but rather will remain in a lowered position wherein liquid from outlet passage 145 will continue to be pumped into delivery passage 159 and into the left end of work cylinder 163 until tap changer shaft 52 is rotated sufficiently through the approximately eighty additional degrees required to accomplish a tap change and actuate tap changer arcuate contact 60 into the next tap position in bridging relation with stationary contacts 4 and 5.

The transformer secondary voltage will thus be raised to approximately 121 volts by the tap change. Pawl 79, arm 83, and end 92 of torsion spring 90 are rotated during the tap change through sixty degrees relative to shafts 36 and 52 to partially unload the torsion spring 90. Unitary assembly 151 and valve 161 will be raised by the change in magnetic flux in the pole structure incident to the tap change, and inasmuch as the feedback means compensates for a three volt change in transformer secondary voltage whenever operating shaft 36 has been rotated sixty degrees, the piston 166 will come to rest at a null position displaced to the right of its central position in work cylinder 163 and with shaft 36 rotated counterclockwise from its initial position. This position corresponding to a transformer secondary voltage of 121 volts and arcuate contact 60 bridging stationary contacts 4 and 5 may be represented at B′ on a straight line graph 261 displaced to the left of curve 260 in FIG. 17. At this neutral position displaced from the initial position the hydraulic and torsion spring forces acting on piston 166 may again come into balance because torsion spring 90 is partially unloaded when the tap change occurs, and the raising of valve 161 by the increase of magnetic flux returns piston 166 sufficiently to the left to change the loading of torsion spring 90 until the force thereof acting on piston 166 is again balanced by the hydraulic force resulting from liquid being pumped past valve 161. Shaft 36 is rotated sufficiently in the clockwise direction to return the radial pin 238 from interfering relation with stop pin 239 and to a position wherein it is spaced approximately twenty degrees from adjusting bracket arm 240. Any further variation of voltage within the bandwidth from this 121 volt position may be represented along graph 261. A return of voltage from 121 volts to the nominal 120 volt value will cause shaft 36 to rotate counterclockwise twenty degrees and the feedback means will cause the piston 166 to assume a neutral position represented at O′ displaced further to the right within work cylinder 163. Each position of tap changer 28 may be represented by a straight line having a slope similar to curves 260 and 261 and which is the locus of the neutral positions obtained by plotting shaft rotation from initial position versus transformer secondary voltage.

If the voltage rises to the upper bandwidth limit of 122 volts, shaft 36 will be rotated sufficiently to bring radial pin 238 into engagement with arm 240 on bandwidth adjusting bracket 241. A departure of the voltage beyond the 122 volt upper bandwidth limit will disable the feedback means and cause the pump to deliver sufficient liquid into the right end of work cylinder 166 to rotate shaft 52 to accomplish a tap change in the clockwise direction and again snap movable contact 60 into bridging relation with stationary contacts 4 and 3.

If the voltage departure is in one direction from the nominal value, the piston 166 will be displaced in one direction from its central position in work cylinder 166 and one end of torsion spring 90, for example end 91, will be deflected relative to the other end and the piston 166 will come to rest in a neutral position. If the transformer secondary voltage now changes so that the departure is in the opposite direction from the nominal value, there is an inherent time delay introduced before a tap change in the opposite direction can be accomplished. Time is required for dog arm 84 to unwind spring end 91 and to deflect torsion spring end 92 through approximately 120 degrees required to wind the torsion spring 90 in the opposite direction to accomplish the tap change. Since piston 166 is displaced in small steps by the minute volume pumped on each stroke of pumping piston rod 123, a time delay of up to one minute can be accomplished before a tap change is accomplished. Further such time delay is adjustable by varying the viscosity of hydraulic fluid 103 and the constants chosen in a particular pump design. This time delay is desirable in that it permits the apparatus to respond to only the average of preceding voltage variations and thus integrates voltage departures versus time and prevents undesirable tap changes that might result from instantaneous voltage variations.

The compensating springs 212 provide another means of adjusting the voltage bandwidth. If the compensating springs 212 are relatively strong (analogous to a rigid connection), the unitary assembly 151 and valve 161 will be returned to a neutral position after a relatively small angular rotation of compensating screw 202, and the graph of operating shaft rotation versus voltage departure may approximate the dotted line 250 in FIG. 17. On the other hand, if the compensating springs 212 are relatively weak, a relatively greater angular rotation of compensating screw 202 and shaft 36 will be required to return valve 161 to a neutral position, and the graph of operating shaft rotation versus voltage departure may approximate the dot-dash line 251 in FIG. 17.

Although the feedback means has been described as being of the mechanical type, it will be appreciated that electrical or hydraulic means can also be utilized to compensate the voltage sensing means for movements of the output shaft. In one alternative embodiment utilizing electrical feedback means a rheostat is connected in series with the energizing coil 107, and the sliding contact of the rheostat is actuated by a friction coupling from the output shaft 36 to change the impedance in series with the energizing winding 107 and thereby compensate for movement of the output shaft and prevent hunting in a manner similar to the disclosed mechanical feedback means. This embodiment differs from the embodiment shown in the drawing in that only a single means exerts a vertical force on the direction-controlling valve.

Although the tap changer 28 has been described in combination with an electromagnetic motor and work cylinder assembly 25 in a self-regulating transformer, it will be appreciated that tap changer 28 can also be utilized to change taps under load manually in a distribution transformer as illustrated in FIG. 19 having the housing 26 and the electromagnetic pump and cylinder assembly 25 omitted. The transformer core and coil assembly 14 and tap changer 28 are substantially identical to the embodiment of FIG. 1. The upper end of operating shaft 36 extends through a suitable flanged bearing 270 in plate 29 and is secured by a transverse pin to a coupling sleeve member 271. Coupling member 271 is also affixed by suitable means such as a set screw to one end of a flexible shaft 273. The other end of flexible shaft 273 extends into the axial bore in a rotatable stub shaft 274 and is secured thereto by suitable means such as a set screw. Stub shaft 274 extends rotatably through a tubular bushing 275 in the sidewall of transformer casing 10. Bushing 275 has a circumferential flange secured preferably by welding to the inner surface of the tank sidewall. An operating handle 277 is secured to stub shaft 274 exterior of casing 10. A circumferential groove in the portion of stub shaft 274 within bushing 275 receives an O-ring gasket to provide a seal of casing 10 at stub shaft 274. A flanged sleeve bushing 280 extending through a bracket 281 welded to the inner periphery of the casing sidewall provides a bearing support for the end of stub shaft 274. A snap ring 282 fitting within a circumferential groove in stub shaft 274 inwardly from bushing 280 prevents outward movement of stub shaft 274.

It is preferable that arcuate contact 60 is not moved into bridging relation with stationary contacts 1 and 6 since this would be a mere duplication of the tap changer position wherein contact 60 bridges stationary contacts 3 and 4. This is prevented in the embodiment of FIG. 1 by the piston 166 abutting against the ends of work cylinder 163. In the manual tap changer embodiment of FIG. 19 the stop pins 49D and 49E are disposed radially inward from the other stop pins 49 by a sufficient amount as shown in FIG. 20 so that pawl 79 cannot be retracted radially inward sufficiently by cam 78 to disengage pawl 79 from pins 49D and 49E. Consequently, contact 60 cannot be moved in the clockwise direction beyond bridging engagement with stationary contacts 1 and 2 or in the counterclockwise direction beyond bridging engagement with stationary contacts 5 and 6.

It will be appreciated that a lineman can change taps under load by manually actuating operating handle 277 and that it is unnecessary to de-energize the transformer and to interfere with service to the customer in order to change taps.

Although the invention has been illustrated and described as including the combination of electromagnetic pump and work cylinder assembly together with a tap changer connected in the transformer primary, it will be appreciated that the disclosed pump and work cylinder assembly having feedback compensating means can also be utilized in combination with other voltage regulating apparatus such as a rheostat. Further, although the feedback means has been illustrated and described in combination with a voltage regulating device having spring means opposing piston displacement and being brought to rest in a null position by the feedback means after the hydraulic and spring forces acting on the work cylinder piston are brought into balance, it will be appreciated that the disclosed feedback compensatory means can bring the voltage regulating apparatus to rest in a null position displaced in proportion to the variation of the voltage from the nominal value even though the voltage regulating apparatus does not include spring means opposing rotation of the output shaft and no resilient means is provided to oppose displacement of the piston. In such embodiments of the invention, the position of the piston within the work cylinder is determined entirely by the difference in hydraulic pressures acting against opposite ends of the piston.

While only a single embodiment of self-regulating distribution transformer has been illustrated and described, many modifications and variations thereof will be apparent to those skilled in the art, and consequently it is intended in the appended claims to cover all such modifications and variations which fall within the true spirit and scope of the invention.

I claim:

1. In combination, an electrical transformer having taps in the primary winding, a tap changer including stationary contacts connected to said taps, rotatable contact means adapted when rotated to sequentially engage said stationary contacts and to change the ratio of transformation of said transformer, a rotatable shaft, means including a spring operatively connected at one end to said shaft and at the other end to said rotatable contact means for stepping said rotatable contact means to a succeeding tap position and opposing rotation of said shaft with a force proportional to the angular rotation thereof; said shaft being rotated through a first predetermined angle between tap positions; a work cylinder, a piston reciprocable within said work cylinder, means for converting displacement of said piston into rotation of said shaft, an electromagnetic vibratory pump having a pole structure and an energizing winding on said pole structure energized from the secondary of said transformer and being responsive to the cyclic fluctuations of the alternating current for pumping liquid, said pump including valve means magnetically suspended in said pole structure in a mean position determined by the strength of the magnetic flux in said pole structure for selectively delivering fluid from said pump into either end of said work cylinder in accordance with said mean position, and feedback compensating means for varying the position of said valve means in accordance with the angular rotation of said shaft, the rate at which the position of the valve means is changed by said feedback means incident to rotation of said shaft being substantially equal to the rate at which the position of said valve means is changed by the magnetic flux as a result of variation in transformer secondary voltage, and means for disabling said feedback means after rotation of said shaft in either direction through a second predetermined angle which is greater than one half said first predetermined angle, said disabling means being adjustable to vary said second predetermined angle.

2. In combination, an electrical transformer having taps in the primary winding, a tap changer including stationary contacts connected to said taps, rotatable contact means adapted when rotated to sequentially engage said stationary contacts and to change the ratio of transformation of said transformer, a rotatable shaft, means including a spring operatively connected at one end to said shaft and at the other end to said rotatable contact means for stepping said rotatable contact means to a succeeding tap position and opposing rotation of said shaft with a force proportional to the angular rotation thereof; said shaft being rotated through a predetermined angle between tap positions; a work cylinder, a piston reciprocable within said work cylinder, means for converting displacement of said piston into rotation of said shaft, an electromagnetic vibratory pump having a pole structure and an energizing winding on said pole structure energized from the secondary of said transformer and being responsive to the cyclic fluctuations of the alternating current for pumping liquid, said pump including valve means magnetically suspended in said pole structure in a mean position determined by the strength of the magnetic flux in said pole structure for selectively delivering fluid from said pump into either end of said work cylinder in accordance with said mean position, and feedback compensating means for varying the position of said valve means in accordance with the angular rotation of said shaft, the rate at which the position of the valve means is changed by said feedback means incident to rotation of said shaft being substantially equal to the rate at which the position of said valve means is changed by the magnetic flux as a result of variation in transformer secondary voltage.

3. In combination, an electrical transformer having taps in the primary winding, a tap changer including stationary contacts connected to said taps, rotatable contact means adapted when rotated to sequentially engage said stationary contacts and to change the ratio of transformation of said transformer, a rotatable shaft, and means including a spring operatively connected to said shaft and to said rotatable contact means for opposing rotation of said shaft with a force proportional to the angular rotation thereof and for stepping said rotatable contact means to a succeeding tap position, said shaft being rotated through a predetermined angle between tap positions; a work cylinder, a piston reciprocable within said work cylinder, means for converting displacement of said piston into rotation of said shaft, an electromagnetic vibratory pump having a pole structure and an energizing winding on said pole structure energized from the secondary of said transformer and being responsive to the cyclic variations of the alternating current for pumping liquid, said pump including valve means magnetically suspended by the magnetic flux in said pole structure for selectively delivering liquid from said pump into opposite ends of said work cylinder in accordance with variations in the transformer secondary voltage above and below a nominal value, and feedback means for varying the position of said valve means in accordance with the angular rotation of said shaft.

4. In combination, an electrical transformer having taps in the primary winding, a tap changer including stationary contacts connected to said taps, rotatable contact means adapted when rotated to sequentially engage said stationary contacts and to change the ratio of transformation of said transformer, a rotatable shaft, means including a spring operatively connected at one end to said shaft and at the other end to said rotatable contact means for stepping said rotatable contact means to a succeeding tap position and opposing rotation of said shaft with a force proportional to the angular rotation thereof; said shaft being rotated through a predetermined angle between tap positions; a work cylinder, a piston reciprocable within said work cylinder, means for converting displacement of said piston into rotation of said shaft, an electromagnetic vibratory pump having a pole structure and an energizing winding on said pole structure energized from the secondary of said transformer and being responsive to the cyclic fluctuations of the alternating current for pumping liquid, said pump including valve means magnetically suspended in said pole structrue in a mean position determined by the strength of the magnetic flux in said pole structure for selectively delivering fluid from said pump into either end of said work cylinder in accordance with said mean position, feedback compensating means for varying the position of said valve means in accordance with the angular rotation of said shaft, the rate at which the position of the valve means is changed by said feedback means incident to rotation of said shaft being substantially equal to the rate at which the position of said valve means is changed by the magnetic flux as a result of variation in transformer secondary voltage, and means for disabling said feedback means after rotation of said shaft in either direction through an angle greater than one half said predetermined angle, said tap changer being adapted to unload said spring when a tap change occurs.

5. In combination, an electrical transformer having taps in the primary winding, a tap changer including stationary contacts arranged in a circle connected to said taps, a shaft coincident with the center of said circle, a member rotatable about the axis of said shaft and relative to said shaft and carrying movable contact means adapted to sequentially engage said stationary contacts to change the ratio of transformation of said transformer, said rotatable member also carrying means including an auxiliary contact spaced from said movable contact means and an impedance electrically connected between said movable contact means and said auxiliary contact for shunting the current to the succeeding stationary contact when said member is rotated and for limiting the current during the interval that adjacent taps are bridged, means including a spring operatively connected to said rotatable member and to said shaft for stepping said movable contact means to the next tap position and for opposing rotation of said shaft with a force proportional to the angle of rotation thereof, said shaft being rotated through a predetermined angle between tap positions; a work cylinder, a piston reciprocable within said work cylinder, means for converting displacement of said piston into rotation of said shaft, an electromagnetic vibratory pump having a pole structure and an energizing winding on said pole structure and being responsive to the fluctuations of the alternating current for pumping liquid, said pump including valve means magnetically suspended in said pole structure in a mean position determined by the strength of the magnetic flux in said pole structure for selectively delivering liquid from said pump into either end of said work cylinder in accordance with said mean position, and compensating feedback means exerting a vertical force on said valve means and varying said vertical force in accordance with the angular rotation of said shaft.

6. In combination, an electrical transformer having taps in the primary winding, a tap changer including stationary contacts arranged in a circle connected to said taps, a shaft coincident with the center of said circle, a member rotatable about the axis of said shaft and relative to said shaft and carrying movable contact means adapted to sequentially engage said stationary contacts to change the ratio of transformation of said transformer, said rotatable member also carrying means including an auxiliary contact spaced from said movable contact means and an impedance electrically connected between said movable contact means and said auxiliary contact for shunting the current to the succeeding stationary contact when said member is rotated and for limiting the current during the interval that adjacent taps are bridged, means including a spring operatively connected to said rotatable member and to said shaft for stepping said movable contact means to the next tap position and for opposing rotation of said shaft with a force proportional to the angle of rotation thereof, said shaft being rotated through a predetermined angle between tap position; a work cylinder, a piston reciprocable within said work cylinder, means for converting displacement of said piston into rotation of said shaft, an electromagnetic vibratory pump having a pole structure and an energizing winding on said pole structure and being responsive to the fluctuations of the alternating current for pumping liquid, said pump including valve means magnetically suspended in said pole structure in a mean position determined by the strength of the magnetic flux in said pole structure for selectively delivering liquid from said pump into either end of said work cylinder in accordance with said mean position, and compensating feedback means exerting a vertical force on said valve means and varying said vertical force in accordance with the angular rotation of said shaft, the rate at which said vertical force on said valve means is changed by said feedback means incident to rotation of said shaft being substantially equal to the rate at which the force exerted by the magnetic flux on said valve means is changed as a result of variation in transformer secondary voltage.

7. In combination, an electrical transformer having taps in the primary winding, a tap changer including stationary contacts arranged in a circle connected to said taps, a shaft coincident with the center of said circle, a member rotatable about the axis of said shaft and relative to said shaft and carrying movable contact means adapted to sequentially engage said stationary contacts to change the ratio of transformation of said transformer, said rotatable member also carrying means including an auxiliary contact spaced from said movable contact means and an impedance electrically connected between said movable contact means and said auxiliary contact for shunting the current to the succeeding stationary contact when said member is rotated and for limiting the current during the interval that adjacent taps are bridged, means included a spring operatively connected to said rotatable member and to said shaft for stepping said movable contact means to the next tap position and for opposing rotation of said shaft with a force proportional to the angle of rotation thereof, said shaft being rotated through a first predetermined angle between tap positions; a work cylinder, a piston reciprocable within said work cylinder, means for converting displacement of said piston into rotation of said shaft, an electromagnetic vibratory pump having a pole structure and an energizing winding on said pole structure and being responsive to the fluctuations of the alternating current for pumping liquid, said pump including valve means magnetically suspended in said pole structure in a mean position determined by the strength of the magnetic flux in said pole structure for selectively delivering liquid from said pump into either end of said work cylinder in accordance with said mean position, compensating feedback means exerting a vertical force on said valve means and varying said vertical force in accordance with the angular rotation of said shaft, the rate at which said vertical force on said valve means is changed by said feedback means incident to rotation of said shaft being substantially equal to the rate at which the force exerted by the magnetic flux on said valve means is changed as a result of variation in transformer secondary voltage, and means for disabling said feedback means after rotation of said shaft in either direction through a second predetermined angle which is greater than one half said first predetermined angle.

8. In combination, an electrical transformer having taps in the primary winding, a tap changer including stationary contacts connected to said taps, rotatable contact means adapted when rotated to sequentially engage said stationary contacts and to change the ratio of transformation of said transformer, a rotatable shaft, and means including a spring operatively connected to said shaft and to said rotatable contact means for opposing rotation of said shaft with a force proportional to the angular rotation thereof and for stepping said rotatable contact means to a succeeding tap position, said shaft being rotated through a predetermined angle between tap positions, a work cylinder, a piston reciprocable within said work cylinder, means for converting displacement of said piston into rotation of said shaft, an electromagnetic vibratory pump having a pole structure and an energizing winding on said pole structure energized from the secondary of said transformer and being responsive to the cyclic variations of the alternating current for pumping liquid, said pump including valve means magnetically suspended by the magnetic flux in said pole structure for selectively delivering liquid from said pump into opposite ends of said work cylinder in accordance with variations in the transformer secondary voltage above and below a nominal value, compensating spring means exerting a vertical force on said valve means, and feedback means for varying the deflection of said compensating springs in accordance with the angular rotation of said shaft, the rate at which the deflection of said compensating springs is varied by said feedback means incident to rotation of said shaft being substantially equal to the rate at which the deflection of said compensating springs is varied by the change of magnetic flux in said pole structure incident to a change in transformer secondary voltage.

9. In combination, an electrical transformer having taps in the primary winding, a tap changer having stationary contacts connected to said taps, an operating shaft, a rotatable contact adapted when rotated to sequentially engage said stationary contacts to change the ratio of transformation of said transformer, means including a spring operatively connected at one end to said shaft and at the other end to said rotatable contact for opposing rotation of said shaft with a force proportional to the angular rotation thereof and for stepping said movable contact to a succeeding tap position, said shaft being rotated through a first predetermined angle between tap positions; a work cylinder, a piston reciprocable within said work cylinder, means for converting displacement of said piston into rotation of said shaft, an electromagnetic pump having a pole structure and an operating winding on said pole structure energized from the secondary winding of said transformer and being responsive to the cyclic fluctuations of the alternating current for pumping liquid, said pump including valve means magnetically suspended in said pole structure for selectively delivering liquid from said pump into either end of said work cylinder in accordance with variations of said voltage above and below a nominal value, feedback compensating means for varying the position of said valve means sufficiently in response to the rotation of said shaft to bring the hydraulic force acting in one direction on said piston into balance with the spring force acting in the opposite direction on said piston after said shaft has rotated through an angle proportional to the variation of said voltage from said nominal value, and means for disabling said feedback means after rotation of said shaft in either direction through an angle greater than one half said first predetermined angle.

10. In combination, an electrical transformer having a primary winding provided with taps, a tap changer having stationary contacts connected to said taps and a movable contact adapted when rotated to sequentially engage said stationary contacts and change the ratio of transformation of said transformer, said movable contact being rotated through a predetermined angle between tap positions, an electromagnetic motor having an operating winding energized from the secondary of said transformer and being responsive to the cyclic fluctuations of the alternating current for energy delivery, energy take-off means operated from said motor and being adapted to rotate said movable contact, said electromagnetic motor including voltage-sensitive direction-controlling means having a mean position determined by a nominal value of the transformer secondary voltage and selectively controlling the direction of energy take-off in accordance with said mean position, and feedback compensating means for varying the position of said direction-controlling means in accordance with the angular rotation of said movable contact.

11. In combination, an electrical transformer having a primary winding provided with taps, a tap changer having stationary contacts connected to said taps and a movable contact adapted when rotated to sequentially engage said stationary contacts and change the ratio of transformation of said transformer, said movable contact being rotated through a predetermined angle between tap positions, an electromagnetic motor having an operating winding energized from the secondary of said transformer and being responsive to the cyclic fluctuations of the alternating current for energy delivery, energy take-off means operated from said motor and being adapted to rotate said movable contact, said electromagnetic motor including voltage-sensitive direction-controlling means having a mean position determined by a nominal value of the transformer secondary voltage and selectively controlling the direction of energy take-off in accordance with said mean position, and feedback compensating means for varying the position of said direction-controlling means in accordance with the angular rotation of said movable contact, the rate at which the position of the direction-controlling means is compensated by said feedback means incident to rotation of said movable contact being substantially equal to the rate at which the position of the direction-controlling means is changed as a result of variation in transformer secondary voltage incident to a tap change.

12. In combination, an electrical transformer having taps in the primary winding, a tap changer including stationary contacts connected to said taps, a movable contact rotatable in either direction into engagement with said stationary contacts to change taps and to raise and lower the ratio of transformation of said transformer, an operating shaft, and resilient means operatively connected to said shaft and to said movable contact for opposing rotation of said shaft with a force proportional to the angular rotation thereof and for stepping said movable contact to a succeeding tap position in response to rotation of said shaft, said shaft being rotated through a predetermined angle between tap positions; a continuously operating electromagnetic motor for rotating said shaft, voltage-sensitive direction-controlling means responsive to the transformer secondary voltage for selectively controlling the direction of rotation of said shaft by said motor in accordance with variations in the magnitude of the transformer secondary voltage above and below a nominal value, means including feedback means between said shaft and said direction-controlling means for bringing said shaft to rest in a null position after rotation thereof through an angle proportional to the variation of said voltage from said nominal value, and means for disabling said feedback means after rotation of said shaft in either direction through an angle greater than one-half said predetermined angle.

13. In combination with an electrical transformer having taps in the primary winding, a work cylinder, a piston reciprocable within said work cylinder, a tap changer having stationary contacts connected to said taps, a movable contact adapted when rotated to sequentially engage said stationary contacts to change taps and vary the ratio of transformation of said transformer, an operating shaft, and means including a spring operatively connected at one end to said shaft and at the other end to said movable contact for stepping said movable contact to a succeeding tap position in response to rotation of said shaft and for opposing rotation of said shaft, said shaft being rotated through a predetermined angle between tap positions; means for converting displacement of said piston into rotation of said shaft, an electromagnetic pump having a pole structure and an operating winding on said pole structure energized from the secondary of said transformer and including a unitary assembly magnetically suspended by the magnetic flux in said pole structure in a mean position corresponding to a nominal value of the transformer secondary voltage, said assembly including an armature arranged to vibrate in accordance with the cyclic fluctuations of the alternating current to pump liquid and valve means adapted to deliver liquid from said pump into either end of said work cylinder in accordance with said mean position, whereby the change in magnetic flux in said pole structure incident to a tap change tends to change the position of said valve means, compensating spring means exerting a vertical force on said magnetically suspended assembly, feedback means for varying the deflection of said compensating spring means in accordance with the rotation of said shaft and for bringing the hydraulic and spring forces acting on said piston into balance after said shaft has been rotated through an angle proportional to the variation of the transformer secondary voltage from said nominal value, the ratio of the change in the deflection of said compensating springs to the variation in voltage actuating said feedback means to change said deflection being substantially equal to the ratio of the change in deflection of said compensating springs by the magnetic flux in said pole structure to the change in transformer secondary voltage causing said change of flux, and means for disabling said feedback means after rotation of said shaft in either direction through an angle greater than one-half said predetermined angle, said tap changer spring being unloaded each time a tap change occurs.

14. In combination with a transformer having taps in the primary, a work cylinder, a piston reciprocable within said work cylinder, a tap changer including stationary contacts connected to said taps, a movable contact adapted when rotated to sequentially engage said stationary contacts to change taps, an operating shaft, means including a spring operatively connected at one end to said shaft and at the other end to said movable contact for stepping said movable contact to a succeeding tap position in response to rotation of said shaft and for opposing rotation of said shaft with a force proportional to the angular rotation thereof, said shaft being rotated through a predetermined angle between tap positions and said spring being unloaded each time a tap change is accomplished; means for converting displacement of said piston into rotation of said shaft, an electromagnetic vibratory pump having a pole structure and an operating winding on said pole structure energized from the secondary of said transformer and including a unitary assembly magnetically suspended by the flux in said pole structure in a mean position corresponding to a nominal value of the transformer secondary voltage, said assembly including an armature arranged to vibrate about said mean position in accordance with the cyclic pulsations of the alternating current to pump fluid and valve means adapted to deliver fluid from said pump into either end of said work cylinder in accordance with said mean position, whereby the change in magnetic flux in said pole structure occurring each time the transformer secondary voltage varies and each time a tap change is accomplished tends to vary the position of said valve means, feedback compensating means for changing the position of said valve means in accordance with the angular rotation of said shaft, the rate at which said feedback means compensates the position of said valve means being substantially equal to the rate at which the position of said valve means is changed by the magnetic flux in said pole structure incident to a variation in said transformer secondary voltage, and means for disabling said feedback means after rotation of said shaft in either direction through an angle greater than one-half said predetermined angle.

15. In combination, an electrical transformer having taps in the primary winding, a tap changer having stationary contacts connected to said taps, movable contact means adapted to sequentially engage said stationary contacts to change taps, a rotatable shaft, and means including a spring operatively connected to said shaft and to said movable contact means for stepping said movable contact means to a suceeding tap position in response to rotation of said shaft and for opposing rotation of said shaft with a force proportional to the angle of rotation thereof, said shaft being rotated through a predetermined angle between tap positions and said spring being unloaded each time a tap change occurs; a work cylinder, a piston reciprocable in said work cylinder, means for converting displacement of said piston into rotation of said shaft, an electromagnetic pump having a pole structure and an operating winding on said pole structure and being responsive to the cyclic fluctuations of the alternating current for pumping liquid, said pump including valve means assuming a position controlled by the strength of the magnetic flux in said pole structure for selectively delivering liquid from said pump into either end of said work cylinder in accordance with variations of the transformer secondary voltage above and below a nominal value, whereby the change in magnetic flux in said pole structure occurring each time the transformer secondary voltage varies and each time a tap change occurs tends to change the position of said valve means, feedback compensating means for varying the vertical force on said valve means in accordance with the angular rotation of said output shaft, the rate at which the vertical force exerted against said valve means is compensated by said feedback means being substantially equal to the rate at which the force exerted on said valve means by the magnetic flux in said pole structure is changed incident to a variation in transformer secondary voltage, and means for disabling said feedback means after rotation of said shaft in either direction through an angle greater than one-half said predetermined angle.

16. In combination, an electrical transformer having taps in the primary winding, an electromagnetic motor, energy take-off means operated by said motor, voltage sensitive means having a mean position determined by a nominal value of the transformer secondary voltage for selectively controlling the direction of energy take-off in accordance with said mean position, a tap changer having stationary contacts connected to said taps, movable contact means adapted when rotated to sequentially engage said stationary contacts to change taps and vary the ratio of transformation of said transformer, a shaft rotatably driven by said take-off means, and means including a spring operatively connected to said shaft and to said movable contact means for stepping said movable contact means to a succeeding tap position in response to rotation of said shaft and for opposing rotation of said shaft with a force proportional to the angular rotation of said shaft, said shaft being rotated through a predetermined angle between tap positions and said spring being unloaded each time a tap change is accomplished, feedback compensating means for varying the position of said voltage sensitive means in accordance with the angular rotation of said shaft, the rate at which the position of said voltage sensitive means is compensated by said feedback means being substantially equal to the rate at which the position of said valve means is changed by a variation in transformer secondary voltage, and means for disabling said feedback means after rotation of said shaft in either direction through an angle greater than one-half said predetermined angle.

17. In combination, an electrical transformer having taps in the primary winding, an electromagnetic motor, energy take-off means operated by said motor, direction-controlling means responsive to the transformer secondary voltage for selectively controlling the direction of energy take-off in accordance with variations of said voltage above and below a nominal value, a tap changer having stationary contacts connected to said taps and a shaft rotatably driven by said energy take-off means and being adapted to change taps in said primary winding in response to rotation of said shaft, said shaft being rotated through a predetermined angle between tap positions and said tap changer including resilient means for opposing rotation of said shaft with a force proportional to the angular rotation of said shaft, said resilient means being unloaded each time a tap change occurs, feedback compensating means actuated in accordance with the angular rotation of said shaft, said direction-controlling means also being responsive to said feedback means, and means for disabling said feedback means after rotation of said shaft in either direction through an angle greater than one-half said predetermined angle.

18. In combination, an electrical transformer having taps in the primary winding, an electromagnetic motor, energy take-off means operated by said motor, a tap changer having stationary contacts connected to said taps and a shaft rotatably driven by said energy take-off means and being adapted to change taps in said primary winding in response to rotation of said shaft, said shaft being rotated through a predetermined angle between tap positions and said tap changer including resilient means for opposing rotation of said shaft with a force proportional to the angular rotation thereof, said resilient means being unloaded each time a tap change occurs, feedback means actuated in accordance with the angular rotation of said shaft, direction-controlling means responsive at a predetermined rate to the transformer secondary voltage for selectively controlling the direction of energy take-off in accordance with variations of said voltage above and below a nominal value and also being responsive to said feedback means at a rate substantially equal to said predetermined rate, and means for disabling said feedback means after rotation of said shaft in either direction through an angle greater than one half said predetermined angle.

19. In combination, an electrical transformer having taps in the primary winding, an electromagnetic motor, energy take-off means operated by said motor, a tap changer including stationary contacts connected to said taps, a shaft rotatably driven by said energy take-off means, a member rotatable relative to said shaft and carrying movable contact means adapted to sequentially engage said stationary contacts to change taps in said winding and also carrying an auxiliary contact adapted to engage a succeeding stationary contact before said movable contact is disengaged from a preceding stationary contact and an impedance connected between said auxiliary contact and said movable contact means, means including a spring operatively connected to said shaft and to said member for stepping said movable contact means to a succeeding tap position in response to rotation of said shaft and for opposing rotation of said shaft with a force proportional to the angular rotation thereof, said shaft being rotated through a predetermined angle between tap positions and said spring being unloaded each time a tap change occurs, feedback means actuated in accordance with the angular rotation of said shaft, direction-controlling means responsive at a predetermined rate to the transformer secondary voltage for selectively controlling the direction of energy take-off in accordance with variations of said voltage above and below a nominal value and also being responsive to said feedback means at substantially said predetermined rate, and means for disabling said feedback means after rotation of said shaft in either direction through an angle greater than one half said predetermined angle.

20. In combination, an electrical transformer having taps in the primary winding, a work cylinder, a piston reciprocable within said work cylinder, a tap changer having stationary contacts connected to said taps and a shaft rotatably driven in response to displacement of said piston and being adapted to change taps in said primary winding in response to rotation of said shaft, said shaft being rotated through a predetermined angle between tap positions and said tap changer including resilient means for opposing rotation of said shaft with a force proportional to the angular rotation thereof, said resilient means being unloaded each time a tap change occurs, feedback means actuated in accordance with the angular rotation of said shaft, a continuously operating electromagnetic pump including direction-controlling means responsive at a predetermined rate to the transformer secondary voltage for selectively pumping liquid into either end of said work cylinder in accordance with variations in said voltage above and below a nominal value and being responsive to said feedback means at substantially said predetermined rate, and means for disabling said feedback means after rotation of said shaft in either direction through an angle greater than one half said predetermined angle.

21. A tap changer comprising a plurality of spaced apart stationary contacts arranged in a circle, a shaft rotatable about an axis coincident with the center of said circle, a plurality of spaced apart stops arranged in a circle having said axis as a center, a member rotatable about said axis and relative to said shaft, said member carrying a movable metallic contact adapted to sequentially bridge between adjacent stationary contacts as said member is rotated and also carrying a pair of auxiliary contacts disposed on opposite sides of and in spaced relation to said movable contact and adapted to engage said stationary contacts as said member is rotated, said auxiliary contacts being angularly spaced apart approximately twice the angular separation between adjacent stationary contacts, said rotatable member also carrying first and second impedances each of which is connected between said movable contact and one of said auxiliary contacts, a holding element operatively connected to said rotatable member for rotation therewith and movable between a normal position wherein it engages one of said stops to prevent rotation of said rotatable member and a second position wherein it is disengaged from said stop and said rotatable member is free to rotate, a spring operatively connected at one end to said shaft and at the opposite end to said rotatable member and biasing said shaft to a normal position relative to said rotatable member, and a releasing member operatively connected to said shaft for rotation therewith and adapted to actuate said holding element to said second position after a predetermined rotation of said shaft from said normal position.

22. A tap changer comprising a cylindrical body portion, a rotatable shaft coaxial with said body portion, a plurality of axially extending leaf spring contacts mounted at one end in spaced apart relation in a circle on said body portion, the free ends of said leaf spring contacts carrying contact buttons and said springs resiliently urging said contact buttons in a radially inward direction, a member rotatably carried on said shaft, said member carrying an arcuate metallic contact adapted to sequentially bridge between the buttons of each adjacent pair of said spring contacts as said member is rotated and also carrying a pair of auxiliary contacts positioned at the leading and trailing edges of said arcuate metallic contact in spaced relation thereto, first and second impedances carried by said rotatable member each of which is connected between said arcuate contact and one of said auxiliary contacts, said auxiliary contacts being adapted to engage said contact buttons as said member is rotated and the angular spacing between said auxiliary contacts being approximately twice the angular separation between adjacent contact buttons, a plurality of spaced apart stop pins mounted on said body portion in a circle having the axis of said cylinder as a center, said rotatable member carrying a pawl movable radially between a first position between adjacent ones of said stop pins wherein it prevents rotation of said metallic contact and a second position wherein it is disengaged from said stop pins, a torsion spring operatively connected at its ends to said shaft and to said rotatable member, and a cam operatively connected to said shaft for rotation therewith and adapted to move said pawl between said first and second positions when shaft is rotated, said spring normally biasing said shaft in a direction to actuate said cam to move said pawl into said first position.

23. A tap changer comprising a plurality of spaced apart stationary contacts arranged in a circle, a shaft rotatable about an axis coincident with the center of said circle, a member rotatable about said axis and relative to said shaft and carrying a movable contact adapted to sequentially bridge adjacent stationary contacts as said member is rotated and also carrying auxiliary contacts disposed on opposite sides of said movable contact and in spaced relation thereto, said auxiliary contacts being spaced apart circumferentially approximately the same distance as alternate ones of said stationary contacts and being adapted to engage said stationary contacts as said member is rotated, said rotatable member also carrying first and second impedances each of which is electrically connected between said movable contact and one of said auxiliary contacts, and means responsive to a predetermined rotation of said shaft for actuating said rotatable member to a position wherein said movable contact is in bridging relation with a succeeding pair of said stationary contacts, said means including means for normally holding said rotatable member against rotation, spring means operatively connected between said rotatable member and said shaft and biasing said shaft to a normal position relative to said rotatable member, and releasing means operatively connected to said shaft for disabling said holding means after a predetermined rotation of said shaft from said normal position.

24. A tap changer comprising a plurality of spaced apart stationary contacts arranged in a circle, a shaft rotatable about an axis coincident with the center of said circle, a member rotatable about said axis and relative to said shaft and carrying a movable contact adapted to sequentially bridge adjacent stationary contacts as said member is rotated and also carrying auxiliary contacts disposed on opposite sides of said movable contact and in spaced relation thereto, said auxiliary contacts being circumferentially spaced apart approximately the same distance as alternate ones of said stationary contacts and being adapted to engage said stationary contacts as said member is rotated, said rotatable member also carrying first and second impedances each of which is electrically connected between said movable contact and one of said auxiliary contacts, and means responsive to a predetermined rotation of said shaft for actuating said rotatable member to a position wherein said movable contact is in bridging relation with a succeeding pair of said stationary contacts, said means including a spring operatively connected at one end to said shaft and at the other end to said rotatable member.

25. A tap changer including a plurality of spaced apart stationary contacts arranged in a circle, a shaft rotatable about an axis coincident with the center of said circle, a member rotatable about said axis and relative to said shaft, said member carrying a movable contact adapted to sequentially bridge adjacent stationary contacts as said member is rotated, an auxiliary contact carried by said rotatable member in spaced relation to said movable contact and adapted when said member is rotated to engage a stationary contact adjacent the pair of stationary contacts bridged by said movable contact before said movable contact is disengaged from one of said pair of stationary contacts, an impedance carried by said rotatable member and electrically connected between said movable contact and said auxiliary contact, means including a spring operatively connected at one end to said shaft and at the other end to said rotatable member for actuating said rotatable member to a position wherein said movable contact is in bridging relation with a succeeding pair of said stationary contacts in response to a predetermined rotation of said shaft, said means including means for normally latching said rotatable member against movement and releasing means operatively connected to said shaft for rendering said latching means inoperative in response to said predetermined rotation of said shaft.

26. In combination, a transformer winding having two isolated portions each of which is provided with a plurality of taps, a tap changer having a plurality of stationary contacts arranged in circumferentially spaced apart relation in a circle, the taps on one of said winding portions being connected to odd-numbered ones of said stationary contacts and the taps on the other of said winding portions being connected to even-numbered ones of said stationary contacts, a member rotatable about an axis coincident with the center of said circle, a metallic movable contact carried by said member and adapted to sequentially engage said stationary contacts when said member is rotated and to normally bridge a pair of adjacent stationary contacts, and means including an impedance and an auxiliary contact carried by said member for shunting the current to a succeeding stationary contact adjacent the pair of contacts bridged by said movable contact before said movable contact is disengaged from one of said pair of stationary contacts and for limiting the circulating current during the interval said one stationary contact and said succeeding stationary contact are bridged, said impedance being electrically connected between said movable contact and said auxiliary contact, said auxiliary contact being adapted to engage said stationary contacts when said member is rotated and being spaced from said movable contact so that said auxiliary contact is normally isolated from said stationary contacts and comes into engagement with said succeeding stationary contact, when said member is rotated, before said movable contact is disengaged from said one of said pair of stationary contacts.

27. A tap changer comprising a body member, a plurality of stationary contacts mounted in a circle in spaced apart relation on said body member, a shaft rotatable about an axis coincident with the center of said circle, a plurality of stop members secured to said body member in spaced apart relation in a circle having said axis as a center, a movable contact rotatable relative to said shaft about said axis into sequential engagement with said stationary contacts and being adapted to short circuit between adjacent stationary contacts, a radially movable pawl operatively connected to said movable contact and normally occupying a position between said stop members and preventing rotation of said movable contact, an eccentric operatively connected to said shaft for rotation therewith and adapted when rotated to retract said pawl from its position between said stop members, a torsion spring surrounding said shaft and having radially extending ends, a dog operatively connected to said shaft for rotation therewith and having an axially extending arm disposed between said radially extending spring ends, and a member operatively connected to said movable contact for rotation therewith and having an axially extending arm disposed between said radially extending spring ends.

28. A tap changer comprising a body member, a plurality of stationary contacts mounted in a circle in spaced apart relation on said body member, a shaft rotatable about an axis coincident with the center of said circle, a plurality of stop members secured to said body member in spaced apart relation in a circle having said axis as a center, a movable contact rotatable relative to said shaft about said axis into sequential engagement with said stationary contacts and being adapted to bridge between adjacent stationary contacts, a radially reciprocable pawl operatively connected to said movable contact for rotation therewith, an eccentric operatively engaging said shaft for rotation therewith, said eccentric engaging said pawl and being adapted to actuate said pawl into a normal position between adjacent ones of said stop members to prevent said movable contact from rotating and to retract said pawl from said normal position as said shaft is rotated, and resilient means operatively connected at one end to said movable contact and at the other end to said shaft for actuating said movable contact into bridging relation with a succeeding pair of said stationary contacts after said shaft has rotated said eccentric sufficiently to withdraw said pawl from its normal position between said stop members.

29. A tap changer comprising a plurality of stationary contacts disposed in spaced apart relation in a circle, a shaft rotatable about an axis coincident with the center of said circle, a plurality of stationary stop members disposed in spaced apart relation in a circle having said axis as a center, a movable contact assembly rotatable about said axis and relative to said shaft, said assembly including a movable contact member adapted to sequentially bridge adjacent stationary contacts as said shaft is rotated, said movable assembly also including a holding member movable between a normal position wherein it engages one of said stop members to prevent rotation of said assembly and a second position wherein it is disengaged from said stop member and said assembly is free to rotate, a spring operatively connected at its ends to said shaft and to said assembly and biasing said shaft to a normal position relative to said assembly, and a releasing member operatively connected to said shaft for rotation therewith and adapted to actuate said holding member to said second position after a predetermined rotation of said shaft from normal position, said assembly also including an auxiliary contact in spaced relation to said movable contact and adapted when said assembly is rotated to engage a stationary contact adjacent the pair of stationary contacts bridged by said movable member before said movable contact is disengaged from one of said pair of stationary contacts, said assembly further including an impedance electrically connected between said movable contact and said auxiliary contact.

30. A tap changer in accordance with claim 29 wherein at least one of said stop members is sufficient distance radially inward from the other stop members to prevent disengagement of said holding member therefrom and thus limit the rotation of said assembly.

31. In combination, a transformer winding having two isolated portions each of which is provided with a plurality of taps, a tap changer including a plurality of stationary contacts arranged in circumferentially spaced apart relation in a circle, the taps on one of said winding portions being connected to odd-numbered ones of said stationary contacts and the taps on the other of said winding portions being connected to even-numbered ones of said stationary contacts, a member rotatable about an axis coincident with the center of said circle, a metallic movable contact carried by said member and adapted to sequentially engage said stationary contacts when said member is rotated and to normally bridge a pair of adjacent stationary contacts, first and second auxiliary contacts carried by said rotatable member in spaced relation to said movable contact and on opposite sides thereof, said first and second auxiliary contacts normally being isolated from said stationary contacts and being circumferentially spaced apart approximately the same distance as alternate ones of said stationary contacts, said first auxiliary contact being adapted to engage a succeeding stationary contact, when said member is rotated, before said movable contact is disengaged from one of said pair of adjacent stationary contacts and said second auxiliary contact being adapted to engage and remain in engagement with said one stationary contact until said movable contact is in bridging relation with said succeeding stationary contact and the other of said pair of adjacent stationary contacts, and first and second impedances carried by said rotatable member each of which is electrically connected between said movable contact and one of said auxiliary contacts, whereby said auxiliary contacts shunt the current to a succeeding tap and said impedances limit the circulating current during the interval that the succeeding stationary contact and said one stationary contact are bridged.

32. A tap changer including a plurality of stationary contacts arranged in circumferentially spaced apart relation in a circle, a member rotatable about an axis coincident with the center of said circle, a metallic movable contact carried by said member and adapted to sequentially engage said stationary contacts when said member is rotated and to normally bridge between a pair of adjacent stationary contacts, an auxiliary contact carried by said rotatable member in spaced relation to said movable contact and adapted when said member is rotated to engage said stationary contacts, said auxiliary contact normally being isolated from said stationary contacts and being spaced from said movable contact so that said auxiliary contact engages a succeeding stationary contact adjacent said pair of stationary contacts bridged by said movable contact, when said member is rotated, before said movable contact is disengaged from one of said pair of stationary contacts, an impedance carried by said member and electrically connected between said movable contact and said auxiliary contact means for normally holding said member in a position wherein said movable contact bridges said pair of adjacent stationary contacts, and spring means operatively connected to said member for rotating said member with a snap action to a succeeding position wherein said movable contact bridges said succeeding stationary contact and the other of said pair of stationary contacts, whereby said auxiliary contact shunts the current to said succeeding stationary contact and said impedance limits the circulating current during the interval said one stationary contact and said succeeding stationary contact are bridged.

33. In combination, a transformer winding having two isolated portions each which is provided with a plurality of taps, a tap changer having a plurality of spaced apart stationary contacts arranged in a circle, the taps on one of said winding portions being connected to alternate ones of said stationary contacts and the taps on the other winding portion being connected to stationary contacts between said alternate stationary contacts, said tap changer having means rotatable about an axis coincident with the center of said circle and carrying a metallic arcuate movable contact adapted to sequentially engage said stationary contacts as said means is rotated and to normally bridge a pair of adjacent stationary contacts, said rotatable means also carrying auxiliary contact means normally isolated from said stationary contacts and adapted when said means is rotated to engage the succeeding stationary contact before said metallic contact is disengaged from one of said pair of adjacent stationary contacts and an impedance electrically connected between said metallic contact and said auxiliary contact means to limit the circulating current during the interval that alternate stationary contacts are bridged, each stationary contact including means for exerting high contact pressure against said movable arcuate contact and said auxiliary contact means.

34. In combination, a transformer winding having two isolated portions each which is provided with a plurality of taps, a tap changer having a plurality of spaced apart stationary contacts arranged in a circle, the taps on one of said winding portions being connected to alternate ones of said stationary contacts and the taps on the other winding portion being connected to stationary contacts between said alternate stationary contacts, said tap changer having means rotatable about an axis coincident with the center of said circle and carrying a metallic movable contact adapted to sequentially engage said stationary contacts as said means is rotated and to normally bridge a pair of adjacent stationary contacts, said rotatable means also carrying first and second auxiliary contacts normally isolated from said stationary contacts and positioned on opposite sides of said movable contact and being spaced apart approximately the same distance as alternate ones of said stationary contacts, the first auxiliary contact being adapted, when said means is rotated in a clockwise direction, to engage the succeeding stationary contact before said movable contact is disengaged from one of said pair of adjacent stationary contact and the second auxiliary contact being adapted to engage said one stationary contact and to remain in engagement therewith until said movable contact bridges said succeeding stationary contact and the other of said pair of stationary contacts, the second auxiliary contact being adapted, when said means is rotated in a counterclockwise direction, to engage the succeeding stationary contact before said movable contact is disengaged from one of said pair of adjacent stationary contacts and the first auxiliary contact being adapted to engage said one stationary contact and to remain in engagement therewith until said movable contact bridges said succeeding stationary contact and the other of said pair of stationary contacts, said rotatable means also carrying first and second impedances each of which is connected between said movable contact and one of said auxiliary contacts.

35. In combination, a transformer winding having two isolated portions each of which is provided with a plurality of taps, a tap changer having a plurality of stationary contacts arranged in circumferentially spaced apart relation in circle, the taps on one of said winding portions being connected to odd-numbered ones of said stationary contacts and the taps on the other of said winding portions being connected to even-numbered ones of said stationary contacts, a member rotatable about an axis coincident with the center of said circle, a metallic movable contact carried by said member and adapted to sequentially engage said stationary contacts when said member is rotated and to normally bridge a pair of adjacent stationary contacts, an auxiliary contact carried by said rotatable member in spaced relation to said movable contact and normally being isolated from said stationary contacts and adapted when said member is rotated to engage a succeeding stationary contact adjacent said pair of stationary contacts bridged by said movable contact before said movable contact is disengaged from one of said pair of contacts, an impedance carried by said member and connected between said movable contact and said auxiliary contact, means for normally holding said member in position wherein said movable contact bridges said pair of adjacent stationary contacts, and spring means operatively connected to said member for actuating said member with snap action to a succeeding tap position wherein said movable contact is disengaged from one of said pair of adjacent stationary contacts and bridges said succeeding stationary contact and the other of said pair of stationary contacts.

36. A tap changer including a plurality of stationary contacts arranged in circumferentially spaced apart relation in a circle, a member rotatable in both clockwise and counterclockwise directions about an axis coincident with the center of said circle, a metallic movable contact carried by said member and adapted to sequentially engage said stationary contacts when said member is rotated and to normally bridge a pair of adjacent stationary contacts, a pair of auxiliary contacts carried by said rotatable member in spaced relation to said movable contact and on opposite sides thereof and being normally isolated from said stationary contacts and being circumferentially spaced apart by approximately the same distance as alternate ones of said stationary contacts and being adapted to engage said stationary contacts when said member is rotated, and first and second impedances carried by said rotatable member each of which is electrically connected between said movable contact and one of said auxiliary contacts, in both clockwise and counterclockwise directions of rotation of said member one auxiliary contact being adapted to engage a succeeding stationary contact before said movable contact is disengaged from one of said pair of adjacent stationary contacts and the other auxiliary contact being adapted to engage said one stationary contact and to remain in engagement therewith until said movable contact is in bridging relation to said succeeding contact and the other of said pair of adjacent stationary contacts.

37. A tap changer in accordance with claim 36 wherein each of said stationary contacts includes an elongated, flexible, flat contact spring disposed parallel to said axis and rigidly mounted at the end spaced from said movable contact on a support member disposed radially inward therefrom and wherein said contact spring is adapted to move radially inward when disengaged from one of said contacts carried by said rotatable member and force fluid from between said spring contact and said support member in direction to lengthen the arc formed between said stationary contact and said one contact.

38. A tap changer comprising a plurality of stationary contacts disposed in spaced apart relation in a circle, a shaft rotatable about an axis coincident with the center of said circle, a plurality of stationary stop members disposed in spaced apart relation in a circle having said axis as a center, a movable contact assembly rotatable about said axis and relative to said shaft, said assembly including a movable contact member adapted to sequentially bridge between adjacent stationary contacts as said shaft is rotated, said movable assembly also including a holding member movable between a normal position wherein it engages one of said stop members to prevent rotation of said assembly and a second position wherein it is disengaged from said stop member and said assembly is free to rotate, a spring operatively connected at its ends to said shaft and to said assembly and biasing said shaft to a normal position relative to said assembly, and a releasing member operatively connected to said shaft for rotation therewith and adapted to actuate said holding member to said second position after a predetermined rotation of said shaft from normal position.

39. In combination with an alternating current power system, an electromagnetic motor, energy take-off means operated by said motor, voltage regulating apparatus operated by said energy take-off means for controlling the voltage of said system and adapted when operated in one direction to raise the voltage of said system and when operated in the opposite direction to lower the voltage of said system, feedback means actuated in accordance with the amplitude of the operation of said voltage regulating apparatus by said take-off means, and direction-controlling means responsive at a predetermined rate to the voltage of said system for selectively controlling the direction of energy take-off in accordance with variations of said voltage above and below a nominal value and also being responsive to said feedback means at a rate substantially equal to said predetermined rate.

40. In combination with an alternating current power system, adjustable voltage regulating apparatus for controlling the voltage of said system, a work cylinder, a piston reciprocable within said work cylinder to adjust said voltage regulating apparatus, an electromagnetic vibratory pump having a pole structure and an operating winding on said pole structure energized from said power system and being responsive to the cyclic fluctuations of the alternating current for pumping liquid, said pump including valve means magnetically suspended by the magnetic flux in said pole structure in a mean position determined by a nominal value of the voltage of said system for selectively delivering liquid from said pump into either end of said work cylinder in accordance with said means position, and feedback means for varying the position of said valve means in accordance with the amplitude of the adjustment of said voltage regulating apparatus by said piston.

41. In an electromagnetic vibratory pump having a pole structure and an energizing winding on the pole structure adapted to be connected to a source of alternating current power, a body portion rigid with the pole structure and having a vertical cylinder therein and a plurality of delivery passages registering with said vertical cylinder, opposed pistons within said cylinder defining a pumping chamber therebetween, an armature magnetically suspended within the pole structure and arranged to vibrate due to cyclic variations of the alternating current impressed on said winding and being rigid with one of said pistons, the improvement comprising a U-shaped weight having the cross-piece thereof operatively connected to the other of said pistons and having sufficient mass to keep it from vibrating, said one piston rigid with said armature being a pumping piston adapted to advance into and retract from said pumping chamber to cause pumping and said other piston connected to said U-shaped weight being a valving piston and being adapted to selectively direct the energy created by said pumping into said delivery passages responsive to the magnitude of the voltage of said alternating current source, and a plurality of superimposed flexible leaf springs operatively connected at their midpoint to said armature and at their ends to the legs of said U-shaped weight.

42. In an electromagnetic vibratory pump having a pole structure and an energizing winding on the pole structure, a body portion rigid with said pole structure and having a vertical cylinder therein and a plurality of delivery passages registering with said cylinder, and a unitary assembly magnetically suspended in a mean position within the pole structure determined by the alternating current voltage impressed on the energizing winding and wherein said unitary assembly includes an armature within the pole structure arranged to vibrate about the mean position due to the cyclic variations of the alternating current and a weight of sufficient mass to keep said weight from vibrating, the improvement comprising opposed pumping and valving pistons within said cylinder jointly defining a pumping chamber therebetween and being operatively connected to said armature and to said weight respectively, said pumping piston being adapted to advance into and retract from said pumping chamber to cause pumping and said valving piston being adapted to selectively direct the output energy created by said pumping action into said delivery passages in accordance with said mean position, and a plurality of superimposed flexible leaf springs connected at spaced apart points to said weight and to said armature, the spring rate of said superimposed leaf springs and the mass of said armature being selected to effect resonance of said armature at the frequency of the fluctuations of the alternating current.

43. In combination, an alternating current transformer having a primary winding divided into two portions each of which is provided with taps, a tap changer having stationary contacts arranged in a circle, even-numbered stationary contacts being connected to taps on one of said primary winding portions and odd-numbered stationary contacts being connected to taps on the other of said primary winding portions, a tap changer including a shaft rotatable about an axis coincident with the center of said circle, a rotatable member coaxial with and rotatable relative to said shaft and carrying movable contact means adapted to sequentially bridge between adjacent stationary contacts, a plurality of spaced apart stops arranged in a circle having the axis of said shaft as a center, said rotatable member carrying a holding element movable between a normal position wherein it engages one of said stops to prevent rotation of said movable contact and a second position wherein it is free of said one stop, an eccentric operatively connected to said shaft and adapted to actuate said holding element to said second position in response to rotation of said shaft, a spring operatively connected at one end to said shaft and at the other end to said rotatable member, said rotatable member also carrying auxiliary contact means for shunting the current to a succeeding stationary contact before said movable contact means is disengaged from a preceding stationary contact and impedance means connected between said movable contact means and said auxiliary contact; a work cylinder, a piston reciprocable within said work cylinder, means for converting displacement of said work cylinder piston into rotation of said shaft, an electromagnetic vibratory pump having a pole structure and an energizing winding on said pole structure energized from the secondary winding of said transformer, said pump actuated by the cyclic variations in the alternating current for pumping liquid and including valve means magnetically suspended by the magnetic flux in said pole structure for selectively directing liquid from said pump into either end of said work cylinder in accordance with variations in the transformer secondary voltage above and below a nominal value, and feedback means for varying the vertical force on said magnetically suspended means in accordance with the angle of rotation of said shaft, said tap changer shaft being rotated through a predetermined angle between tap positions, and bandwidth determining means for disabling said feedback means after rotation of shaft in either direction through an angle greater than one half said predetermined angle.

44. In combination, an electrical transformer having taps in the primary winding, a tap changer having stationary contacts connected to said taps and a moveable contact adapted when rotated to sequentially engage said stationary contacts to change taps in said winding, a rotatable shaft, and means including a spring operatively connected to said shaft and to said moveable contact for stepping said movable contact to a succeeding tap position in response to rotation of said shaft and for opposing rotation of said shaft with a force proportional to the angular rotation thereof, said shaft being rotated through a predetermined angle between tap positions and said spring being unloaded each time a tap change occurs; a work cylinder, a piston reciprocable within said work cylinder, said shaft being rotatably driven in response to displacement of said piston within said cylinder, an electromagnetic pump having a pole structure and an operating winding on the pole structure energized from the secondary of said transformer and being responsive to the fluctuations of the alternating current for pumping liquid, said pump including valve means magnetically suspended in a mean position in said pole structure determined by a nominal value of the transformer secondary voltage for selectively directing the liquid from said pump into either end of said work cylinder in accordance with said mean position, feedback compensating means for varying the position of said valve means in accordance with the angle of rotation of said shaft, said valve means being responsive to both the magnetic flux in said pole structure and to said feedback means at substantially the same rate for a given variation in the transformer secondary voltage, said feedback means compensating said valve means for rotation of said shaft through an angle at least equal to said predetermined angle, and voltage bandwidth determining means for disabling said feedback means in response to a predetermined rotation of said shaft in either direction.

45. In combination, an electrical transformer having taps in the primary winding, a work cylinder, a piston within said cylinder, a tap changer having stationary contacts connected to said taps and a movable contact adapted when rotated to sequentially engage said stationary contacts to change taps and in said winding, a shaft rotatably driven in response to displacement of said piston within said work cylinder, and means including a spring operatively connected to said shaft and to said movable contact for stepping said movable contact to a succeeding tap position in response to rotation of said shaft and for opposing rotation of said shaft with a force proportional to the angular rotation thereof, an electromagnetic vibratory pump having a pole structure and an operating winding on said pole structure energized from the secondary of said transformer and being responsive to the pulsations of the alternating current for pumping liquid, said pump including valve means suspended by the magnetic flux in said pole structure in a mean position determined by a nominal value of the transformer secondary voltage for selectively directing liquid from said pump into either end of said work cylinder in accordance with said mean position, feedback means for varying the position of said valve means sufficiently in response to rotation of said shaft to bring the hydraulic and spring forces acting on said piston into balance after rotation of said shaft through an angle proportional to the variation of said voltage from said nominal value, said shaft being rotated through a predetermined angle between tap positions and said feedback means compensating said valve position for rotation of said shaft through an angle at least equal to said predetermined angle, said spring being unloaded each time a tap change occurs, whereby after a tap change the hydraulic and spring forces acting on said piston will again be brought into balance after rotation of said shaft by the hydraulic forces through a sufficient angle to permit the feedback means to compensate the valve position for the change in voltage occurring as a result of the tap change.

46. In combination with an alternating current power system, a voltage regulating device for controlling the voltage of said system, said voltage regulating device having an operating element and being adapted to selectively raise and lower the voltage of said system in response to a predetermined displacement of said element in opposite directions from an initial position, means for opposing displacement of said element from said initial position with a force proportional to the magnitude of said displacement, motor means for displacing said operating element, magnetically actuated means responsive to the voltage of said system for selectively controlling the direction of displacement of said element by said motor means in accordance with variations in the voltage of said system above and below a nominal value and for supplying energy to actuate said motor means, and feedback means actuated in response to displacement of said element for opposing actuation of said direction-controlling means, said direction-controlling means being responsive to said feedback means at a sufficient rate to bring said element to rest balanced against said displacement opposing means after a displacement thereof by said motor means proportional to the variation of said voltage from said nominal value, whereby said voltage regulating device integrates the voltage variations from said nominal value.

47. In combination with an alternating current power system, a voltage regulating device for controlling the voltage of said system, said device having an operating element and being adapted to selectively raise and lower the voltage of said system in response to displacement of said element in opposite directions from initial position, means for opposing displacement of said element from said initial position with a force proportional to the magnitude of said displacement, hydraulic fluid motor means for displacing said operating element, means energized from said power system for supplying fluid under pressure to actuate said motor means and having a valve positioned responsive to the voltage of said system for selectively controlling the direction of displacement of said element by said motor means in accordance with variations in the voltage of said system above and below a nominal value, and feedback means for varying the position of said valve sufficiently in response to displacement of said element to bring said element to rest after a displacement thereof by said motor means proportional to the variation of said voltage from said nominal value, whereby said device integrates voltage variations from said nominal value.

48. In combination, a work cylinder, a piston reciprocable within said work cylinder, an electromagnetic pump having a pole structure and an energizing winding on said pole structure, said pump including a unitary assembly magnetically suspended by the magnetic flux in said pole structure in a mean position determined by a nominal value of the alternating current voltage impressed on said winding, said unitary assembly including an armature arranged to vibrate about said mean position in response to the cyclic pulsations of the magnetic flux to pump liquid and valve means adapted to selectively deliver liquid from said pump into either end of said work cylinder in accordance with said mean position, a rotatable shaft, means for converting displacement of said piston within said work cylinder into rotation of said shaft, and feedback means for varying the vertical position of said unitary assembly and said valve means as a function of the rotation of said shaft.

49. The combination defined by claim 48 wherein said feedback means includes compensating spring means exerting a vertical force on said magnetically suspended assembled and means for varying the deflection of said compensating springs means in accordance with the rotation of said shaft.

50. The combination defined by claim 48 wherein said feedback means includes compensating spring means connected at one end to said unitary assembly for exerting a vertical force on said unitary assembly, a screw coupling, one member of said screw coupling being operatively connected to said shaft for rotation therewith, and an element pivotally held at one end and affixed at its other end to the other end of said compensating spring means and being pivoted intermediate its ends on the other member of said screw coupling.

51. In combination, a work cylinder, a piston reciprocable within said work cylinder, an electromagnetic pump having a pole structure and an energizing winding on said pole structure and being responsive to the fluctuations in the magnetic flux in said pole structure for delivering liquid under pressure, said pump including valve means magnetically suspended in a mean position by the magnetic flux in said pole structure and adapted to selectively deliver liquid from said pump into either end of said work cylinder in accordance with said means position, an output shaft, means for converting displacement of said piston within said cylinder into rotation of said output shaft, and feedback means for varying the vertical position of said magnetically suspended valve means in accordance with the angular rotation of said output shaft.

52. In combination, a work cylinder, a piston reciprocable within said work cylinder, a rotatable shaft, means for converting displacement of said piston into rotation of said shaft, an electromagnetic pump having a pole structure and a winding on said pole structure and being responsive to the cyclic fluctuations of an alternating current voltage impressed on said winding for pumping liquid, said pump also including valve means occupying a position determined by the voltage impressed on said winding for selectively delivering liquid from said pump into either end of said work cylinder in accordance with the variation in the magnitude of said voltage above and below a nominal value, a voltage regulating device operatively connected to said shaft and including resilient means opposing rotation of said shaft in either direction with a force proportional to the angular rotation thereof, and feedback means for varying the position of said valve means sufficiently in accordance with the rotation of said shaft to bring the hydraulic and resilient means forces acting in opposite directions on said piston into balance after rotation of said shaft through an angle proportional to the variation of said voltage from said nominal value.

53. The combination defined by claim 52 and including means to disable said feedback means after a predetermined angular rotation of said shaft in either direction.

54. In combination, an electromagnetic vibratory motor including a pole structure, an energizing winding on said pole structure, a body portion rigid with said pole structure and having a vertical cylinder therein, an armature within said pole structure, a work cylinder, a piston reciprocable within said work cylinder, a pumping piston rod rigid with said armature and reciprocable within said vertical cylinder, a valving piston rod within said vertical cylinder and together with said pumping piston rod defining a pumping chamber therebetween, resilient means including a plurality of superimposed flexible leaf springs for connecting said valving piston rod to said pumping piston rod, a weight connected to said valving piston rod, said valving piston rod and said pumping piston rod and said resilient means and said weight constituting a unitary assembly magnetically suspended in a mean position within said pole structure when an alternating current voltage is impressed on said energizing winding and said armature and pumping piston rod being arranged to vibrate about said mean position in response to the cyclic fluctuations of the magnetic flux in said pole structure to pump fluid from said pumping chamber, said weight being of sufficient mass to prevent said valving piston rod from vibrating and said valving piston rod selectively delivering the fluid from said pump into opposite ends of said work cylinder in accordance with said mean position, a rotatable output shaft, means including a rack within said work cylinder secured to said piston and a pinion within said work cylinder meshing with said rack for converting displacement of said piston into rotation of said output shaft, and feedback means for varying the vertical position of said unitary assembly including said valving piston rod as a function of the rotation of said output shaft.

55. The combination defined by claim 54 wherein said feedback means includes compensating spring means for exerting a vertical force on said magnetically suspended unitary assembly and a screw coupling operatively connected to said output shaft for varying the deflection of said compensating spring means in accordance with the rotation of said output shaft.

56. In combination, an electromagnetic motor having a pole structure and an operating winding on said pole structure and being responsive to the fluctuations of the alternating current voltage impressed on said winding for energy delivery, means controlled by the strength of the magnetic flux in said pole structure for determining the direction of energy take-off of said motor in accordance with variations of the voltage impressed on said winding above and below a nominal value, energy take-off mechanism operated by said motor, a shaft rotatably driven by said energy take-off mechanism, and feedback means operated in accordance with the angular rotation of said shaft, said direction-determining means being responsive to said feedback means at a sufficient rate to bring said shaft to rest after rotation thereof through an angle proportional to the variation of said voltage from said nominal value.

57. In combination, an electrical transformer having taps in the primary winding, a tap changer including stationary contacts connected to said taps, movable contact means adapted when rotated to sequentially engage said stationary contacts and to vary the ratio of transformation of said transformer, an operating shaft, and means including a spring operatively connected to said movable contact means and to said shaft for stepping said movable contact means to a succeeding tap position and for opposing rotation of said shaft with a force proportional to the angular rotation thereof, said shaft being rotated through a predetermined angle between tap positions, a work cylinder, a piston reciprocable within said work cylinder, means for converting displacement of said piston into rotation of said shaft, an electromagnetic vibratory pump having an operating winding energized from the secondary of said transformer and being responsive to the cyclic fluctuations of the alternating current for pumping liquid, said pump including voltage sensitive valve means occupying a position in accordance with the transformer secondary voltage for selectively directing liquid from said pump into either end of said work cylinder in accordance with variations in the magnitude of the transformer secondary voltage above and below a nominal value, feedback means for varying the position of said valve means as a function of the angular rotation of said shaft and for bringing said shaft to rest in a null position after rotation thereof through an angle proportional to the variation of said voltage from said nominal value, the hydraulic force acting against one end of said work cylinder piston being balanced at said null position by the force of said tap changer spring tending to actuate said piston in the opposite direction, and voltage bandwidth determining means for disabling said feedback means after rotation of said shaft in either direction through an angle greater than one half said predetermined angle.

58. An electrical transformer including, a closed magnetic core having a winding leg, a cylindrical winding on said core leg provided with taps, a tap changer having a plurality of spaced apart stationary contacts connected to said taps and rotatably contact means adapted to sequentially engage said stationary contacts, means for normally holding said rotatable contact means in engagement with at least one of said stationary contacts, and means for actuating said rotatable contact means with a snap action out of engagement with said one stationary contact and into an engagement with a succeeding stationary to change taps while said winding is energized, whereby an arc is drawn when said movable contact is disengaged from said one stationary contact, said tap changer being positioned so that said stationary contacts are within the middle one third of the axial length of said cylindrical winding.

References Cited in the file of this patent

UNITED STATES PATENTS

| | | |
|---|---|---|
| 673,567 | Pignolet | May 7, 1901 |
| 2,231,627 | Jansen | Feb. 11, 1941 |
| 2,298,542 | Potter et al. | Oct. 13, 1942 |
| 2,453,451 | Moseley | Nov. 9, 1948 |
| 2,470,625 | Kuhn | May 17, 1949 |
| 2,627,811 | Van Ryan | Feb. 10, 1953 |
| 2,676,462 | Berry | Apr. 27, 1954 |
| 2,677,113 | Godfrey | Apr. 27, 1954 |
| 2,682,748 | Ernst | Aug. 10, 1954 |
| 2,685,838 | Weinfurt | Aug. 10, 1954 |
| 2,693,573 | Perkins | Nov. 2, 1954 |
| 2,721,969 | Van Ryan et al. | Oct. 25, 1955 |
| 2,767,369 | Schindler | Oct. 16, 1956 |
| 2,811,595 | Baguhn | Oct. 29, 1957 |
| 2,841,662 | Sealey | July 1, 1958 |
| 2,875,399 | Deniau | Feb. 24, 1959 |